(12) United States Patent
Gueziec et al.

(10) Patent No.: US 6,307,551 B1
(45) Date of Patent: *Oct. 23, 2001

(54) METHOD FOR GENERATING AND APPLYING CHANGES IN THE LEVEL OF DETAIL OF A POLYGONAL SURFACE

(75) Inventors: Andre Gueziec, Mamaroneck, NY (US); Francis Lazarus, Pitiers (FR); Gabriel Taubin, Hartsdale, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,988

(22) Filed: Jan. 14, 1998

Related U.S. Application Data

(60) Provisional application No. 60/035,014, filed on Jan. 15, 1997.

(51) Int. Cl.[7] .................................................. G06T 15/00
(52) U.S. Cl. .............................................................. 345/419
(58) Field of Search .................................... 345/419, 423, 345/428, 429, 441, 442

(56) References Cited

U.S. PATENT DOCUMENTS

| | | | |
|---|---|---|---|
| 5,736,987 | * | 4/1998 | Drucker et al. ...................... 345/420 |
| 5,768,156 | * | 6/1998 | Tautges et al. .................. 395/500.21 |
| 5,905,507 | * | 5/1999 | Rossignac et al. .................... 345/440 |

OTHER PUBLICATIONS

Gueziec, Andre, "Surface Simplification with Variable Tolerance", MRCAS '95, Nov. 4, 1995, 8 pages.

Taubin, Gabriel et al., "Geometric Compression Through Topological Surgery", RC20340 (#89924) Jan. 16, 1996 Computer Sciences, 22 pages.

Gueziec, Andre, et al., Cutting and Stitching: Efficient Conversion of a Non–Manifold Polygonal Surface to a Manifold, RC20935 (92693), Jul. 25, 1997, Computer Science/Mathematics, 32 pages.

Gueziec, Andre, "Surface Simplification Inside a Tolerance Volume", RC 20440(90191) May 20, 1997 Updated/Revised, Computer Science/Mathematics, 56 pages.

* cited by examiner

Primary Examiner—Tan Nguyen
Assistant Examiner—Thu Nguyen
(74) Attorney, Agent, or Firm—Casey August, Esq.; Perman & Green, LLP

(57) ABSTRACT

A computer implemented method is disclosed for increasing the level of detail of a polygonal surface. A first step of the method provides data in a memory of a computer (50) for representing a polygonal surface that is defined at least by a plurality of vertices, triangles and edges. Further steps of the method include providing a list of marked edges; cutting through the marked edges thereby creating new boundary vertices; applying displacements to the new boundary vertices thereby generating at least one hole in the surface, the hole being bounded by the displaced new boundary vertices; and filling the at least one hole with a forest of triangles. The step of providing data for representing the polygonal surface preferably includes a step of appending artificial vertices and triangles to the polygonal surface to fill potential boundary holes; and then subsequently removing or ignoring the artificial vertices and triangles when rendering the surface for display. Also disclosed is an improved data structure for representing a polygonal surface. The data structure is composed of a surface description containing a list of vertices and a list of triangles, said further includes data for specifying edge marks, vertex displacements, and a triangle forest.

9 Claims, 19 Drawing Sheets

A: LEVEL I SURFACE
(HIGHER LOD SURFACE)

B: LEVEL 0 SURFACE
(LOWER LOD SURFACE)
WITH MARKED EDGES

COLLAPSING A SURFACE EDGE

A

EXEMPLARY TRIANGLE TREE, 23A

B

C

EXAMPLES OF SURFACES THAT ARE NOT TRIANGLE TREES

A: TRIANGLE FOREST, 23
(COLLECTION OF TRIANGLE TREES, 23A)

B: INTERIOR EDGE    C: BOUNDARY EDGE

UPDATING REPRESENTATIVES OF VERTICES
DURING AN EDGE COLLAPSE

COLLAPSE IF THE BLUE TRIANGLES
BELONG TO DIFFERENT COMPONENTS

SAME AS A1

DO NOT COLLAPSE

DO NOT COLLAPSE

A

LOWER LOD SURFACE

B

EDGE MARKS

C

VERTEX DISPLACEMENTS

D

TRIANGLE TREE

E

HIGHER LOD SURFACE

RE-ENUMERATION OF VERTICES AFTER CUTTING

RULE 1: FOR EACH VERTEX THAT IS SPLIT, THE CORNER GROUP (EDGE-CONNECTED GROUP OF TRIANGLES) WITH THE LOWEST CORNER NUMBER KEEPS THE EXISTING VERTEX NUMBER

RULE 2: FOR THE REPRINTING TRIANGLE GROUPS, NEW VERTEX NUMBERS ARE GIVEN ACCORDING TO INCREASING CORNER GROUP IDENTIFIERS

ORIGIN=2　　　　　　　　　　　ORIGIN=3

PROPOSED CONVENTION FOR CHOOSING A VERTEX ORIGIN
IN A CLOSED LOOP OF EDGES: USE THE LOWEST VERTEX II

A: LEVEL I SURFACE
(HIGHER LOD SURFACE)

B: LEVEL 0 SURFACE
(LOWER LOD SURFACE)
WITH MARKED EDGES

| VERTEX ID IN A | VERTEX ID IN C |
|---|---|
| 6 | 8 |
| 5 | ① |
| 9 | 5 |
| 18 | 4 |
| 4 | 20 |
| 23 | 3 |
| 25 | 15 |
| ③ | 16 |

D: TABLE 26 STORING
A ONE TO ONE NAPPING
BETWEEN THE VERTICES OF
THE RED-AND-BLUE EDGES

C: LEVEL 0 SURFACE
AFTER CUTTING THROUGH
MARKED EDGES

| L | R |
|---|---|
| 0 | 1 |
| 1 | 1 |
| 0 | 0 |
| 1 | 0 |
| 0 | 1 |
| 0 | 0 |

LEFT BRANCHES ARE VISITED FIRST

A  REPRESENTATION OF A TRIANGLE TREE REQUIRING TWO BITS PER TRIANGLE

B

| LENGTH OF RUN | ENDS IN BRANCHING NODE YES(1)/NO(0) | MARCHING PATTERN |
|---|---|---|
| 2 | 1 | R |
|  |  |  |
| 1 | 0 | LENGTH−1 |
| 3 | 0 | LR |

LEFT BRANCHES ARE VISITED FIRST

REPRESENTATION OF A TRIANGLE TREE REQUIRING ASYMPTOTICALLY ONE BIT PER TRIANGLE

ARTIFICIAL TRIANGLES
SURFACE BOUNDARY
ARTIFICIAL VERTEX

HIGHER LEVEL OF DETAIL

LOWER LEVEL OF DETAIL

METHOD FOR GENERATING AND APPLYING CHANGES IN THE LEVEL OF DETAIL OF A POLYGONAL SURFACE

CROSS-REFERENCE TO RELATED APPLICATIONS

This patent application claims priority under 35 U.S.C §119 from Provisional U.S. patent application Ser. No. 60,035,014, filed Jan. 15, 1997, entitled "Compressed Delta Surfaces" by A. Gueziec et al. This application claims priority under 35 U.S. U.S.C. 120 from patent application Ser. No. 08/840,001, filed on Apr. 24, 1997, entitled "Method to Convert Non-Manifold Polyhedral Surfaces into Manifold Surfaces" by A. Gueziec and G. Taubin, and U.S. patent application Ser. No. 08/688,572, filed Jul. 30, 1996, entitled "Compression of Simple Geometric Models Using Spanning Trees" by J. Rossignac and G. Taubin. This application is related to U.S. patent application Ser. No. 09/006,771 filed concurrently herewith, entitled "Compressed Representation of Changing Meshes and Method to Decompress", by G. Taubin et al. These applications are herein incorporated by reference in their entirety.

FIELD OF THE INVENTION

This invention relates to the field of computer graphics and, in particular, to methods for building surface levels of details suitable for fast transmission over computer networks.

BACKGROUND OF THE INVENTION

Polygonal surfaces are widely used for representing three dimensional (3-D) geometric models. Such surfaces consist of a plurality of polygons, which are cycles of vertices, whose coordinates are generally expressed in a modeling space coordinate system. The polygonal surfaces may be used for generating pictures and animations, and may also be used in Computer Aided Design (CAD) systems, in scientific visualization, and in medical imaging.

However, typical polygonal surfaces may be so large that real time interaction is impossible using current hardware, or that the transmission of the data describing the surfaces over computer networks is unacceptably slow. Providing different resolutions, or levels of details (LODs), of such polygonal surfaces overcomes this problem as it is possible to use an appropriate lower LOD for a given task. Such LODs may be generated using a software modeling tool or by using algorithms that automatically produce LODs. One example of such algorithms is described in commonly assigned U.S. Pat. No. 5,448,686 "Multi-Resolution Graphic Representation Employing at Least One Simplified Model for Interactive Visualization Applications", by P. Borrel and J. Rossignac, the disclosure of which is incorporated by reference herein in its entirety. Another example of a LOD generation algorithm is described in commonly assigned U.S. patent application Ser. No. 08/742,631 filed Nov. 1, 1996, "Surface Simplification Preserving a Solid Volume and Respecting Distance Tolerances", by A. Gueziec, herein incorporated by reference in its entirety. Reference in this regard may also be had to a publication entitled "Surface Simplification with Variable Tolerance", A. Gueziec, Second Annual International Symposium on Medical Robotics and Computer Assisted Surgery, pages 132–139, Baltimore, Md., November 1995.

Such polygonal surfaces and LODs of polygonal surfaces are increasingly exchanged over computer networks. When transmitting several LODs of the same polygonal surface, it is desirable to avoid transmitting duplicate information.

In addition, when transmitting the data through a computer network, one may wish to progressively display a surface such that while the computer is busy preparing high resolution images, lower resolution images are quickly available for display and interaction using simplified models.

Conventional methods for producing levels of details from polygonal surfaces include four techniques, described by Hoppe "Progressive Meshes", Proceedings of ACM SIGGRAPH'93, pp. 99–108, by Eck et al. "Multi-resolution analysis of arbitrary meshes", Proceedings of ACM SIGGRAPH'95, pp. 173–182, by Popovic et al. "Progressive Simplicial Complexes", Proceedings of ACM SIGGRAPH'97, pp. 217–224, and by De Floriani et al. "Building and Traversing a Surface at Variable Resolution", IEEE Visualization'97, pp. 103–110. The technique of Hoppe builds a progressive mesh representation that consists of a description of the transition from a simplified mesh to the original mesh. Hoppe sends a succession of "vertex splits", in order to undo the edge collapses that he performed earlier. For each of these edge splits, he must specify the indices in the original mesh of the simplified vertex resulting from the collapse, as well as the indices of the neighboring vertices where the new triangles will be inserted. In addition, the displacement of the new vertex with respect to the previous position of the vertex must be specified.

One problem with Hoppe's Progressive Meshes technique is that each vertex split information contains a vertex identification (ID), the position of two vertices after splitting, and the relative position of two vertices in the neighborhood of the first vertex. This results in sending a significant amount of information. Since the number of vertex splits that are specified are generally on the order of magnitude of n, the information that must be provided with Hoppe's method can be assumed to be on the order of n*log(n) or higher.

Another drawback to the use of Hoppe's method is that each individual vertex split must be specified.

The technique of Eck et al. builds an approximation of the original mesh that has the same connectivity as a subdivided surface. The position of the vertices are treated as a signal decomposed over a multi-resolution wavelet basis. Levels of detail are obtained by varying the number of wavelet coefficients that are transmitted. One problem with this approach is that the highest level of detail is still an approximation to the original polyhedron, and one may need to provide an unacceptably large number of wavelet coefficients to approach the original polygonal surface with sufficient accuracy. In general, this technique is only suitable if a lossy result for geometry and topology is acceptable. It should also be noted that Eck's techniques for building the base surface are complex and computationally expensive. Further, it should be noted that when the topology of the surface is fairly complex, i.e, when the surface has a large number of boundary curves or an Euler characteristic largely higher or largely lower than zero (for instance, a torus has an Euler characteristic of 0, a double torus of −2, a triple torus of −4 and so on, a disk has one boundary curve corresponding to the outer circle of the disk; boundary curves and the Euler characteristic are defined in various textbooks such as Massey's "Algebraic Topology", Springer Verlag, 1977), it is not clear whether Eck's method and related methods can obtain a useful approximation of the surface.

The Progressive Simplicial Complexes technique of Popovic and Hoppe is a generalization of the Progressive Meshes technique to simplicial complexes formed with points, lines, surfaces and volumes. A vertex split is replaced with a "generalized vertex split", and additional information is necessary to encode whether the added vertex will add a point, a line segment, a triangle, or a tetrahedron to the complex. This method suffers from the same limitations as Hoppe's, when applied to a polygonal surface.

The Multi-Triangulation technique of De Floriani et al. is essentially a method for representing several levels of detail of a surface simultaneously, using a directed acyclic graph whose nodes represent increases and decreases of the number of triangles and whose arcs represent the dependencies between such increases or decreases. It is not stated how the levels of detail could be transmitted efficiently.

None of the above methods known to the inventors enable one to represent and encode changes of surface levels of detail in an efficient manner. There is thus a long felt need to overcome these and other problems of the prior art and to provide an automatic generation and representation of surface level of detail changes.

OBJECTS AND ADVANTAGES OF THE INVENTION

It is a first object and advantage of this invention to provide a method for transmitting information to update an existing level of detail to bring it to a next resolution level, rather than sending the information specifying the next resolution level.

It is a further object and advantage of this invention to provide an enhanced method for testing for the collapsibility of edges of a polygonal surface representation.

It is another object and advantage of this invention to provide an improved data structure for representing a polygonal surface, wherein the data structure has a surface description formed of a list of vertices and a list of triangles, the data structure further having data for specifying edge marks, vertex displacements, and a triangle forest.

SUMMARY OF THE INVENTION

The foregoing and other problems are overcome and the objects and advantages are realized by methods and apparatus in accordance with embodiments of this invention.

A computer implemented method is disclosed for generating a representation of a polygonal surface. The method includes a first step of providing data in a memory of a computer for representing a polygonal surface defined by triangles having edges, wherein each edge is defined by two vertices. Further steps include cutting through marked edges and creating boundary vertices defined by vertices of the cut edges; forming at least one region by displacing the boundary vertices; determining a forest of triangles that fills the at least one region; and generating a representation of the polygonal surface that includes data representing the forest of triangles.

Further in accordance with the teaching of this invention a computer implemented method is disclosed for increasing the level of detail of a polygonal surface. A first step of the method provides data in a memory of a computer for representing a polygonal surface that is defined at least by a plurality of boundary vertices, triangles and edges. Further steps of the method include providing a list of marked edges; cutting through the marked edges thereby creating new boundary vertices; applying displacements to the new boundary vertices thereby generating at least one hole in the surface, the hole being bounded by the displaced new boundary vertices; and filling the at least one hole with a forest of triangles. The step of providing data for representing the polygonal surface preferably includes a step of appending artificial vertices and triangles to the polygonal surface to fill potential boundary holes; and then subsequently removing or ignoring the artificial vertices and triangles when rendering the surface for display.

Further in accordance with the teaching of this invention a computer implemented method is disclosed for increasing the level of detail of a polygonal surface. This method includes steps of simplifying the polygonal surface; computing a low level of detail (LOD) polygonal surface; computing edge marks and vertex displacements relative to the low LOD polygonal surface; and determining a triangle forest to be added and stitched to the low LOD polygonal surface to form a higher LOD polygonal surface. The step of simplifying the polygonal surface includes steps of creating a priority queue of surface edges, and for each edge in the priority queue, extracting an edge from the queue, testing the collapsibility of the extracted edge, and collapsing the extracted edge if the edge is determined to be collapsible.

The step of testing the collapsibility of the extracted edge includes steps of applying a preliminary collapsibility test to an edge extracted from the queue. If the edge passes the preliminary collapsibility test, the method applies, in accordance with an aspect of this invention, further tests for determining whether an incremental surface comprised of a set collapsed triangles is a triangle forest, and for determining whether the set of collapsed triangles and a set of remaining triangles are manifolds. A secondary collapsibility test is then applied to the edge extracted from the queue.

The step of applying further tests includes steps of (a) performing a test to determine that the incremental surface has no interior vertices; (b) performing a test to determine that a split surface and the incremental surface are manifolds; and (c) performing a test to determine if a loop exists in the incremental surface. A comprehensive test that is applied on the incremental surface is based on triangle adjacency tests, triangle/vertex adjacency tests, and vertex and triangle boundary tests.

This invention further provides an improved data structure for representing a polygonal surface. The data structure is composed of a surface description containing a list of vertices and a list of triangles, said further includes data for specifying edge marks, vertex displacements, and a triangle forest.

BRIEF DESCRIPTION OF THE DRAWINGS

The above set forth and other features of the invention are made more apparent in the ensuing Detailed Description of the Invention when read in conjunction with the attached Drawings, wherein:

FIG. 10-C1 illustrates Step 210 of FIG. 4 where v2 is a boundary vertex.

FIG. 10-C2 illustrates Step 215 of FIG. 4 where v2 is a boundary vertex and to is a boundary triangle.

FIG. 10-C3 illustrates Step 220 of FIG. 4 where all triangles incident to v2 are highlighted (except from t0).

FIG. 11-B1 and 11-B2 illustrate Step 260 of FIG. 4 where triangles t0 and t1 are adjacent to at most one highlighted triangle.

DETAILED DESCRIPTION OF THE INVENTION

Figure 1:
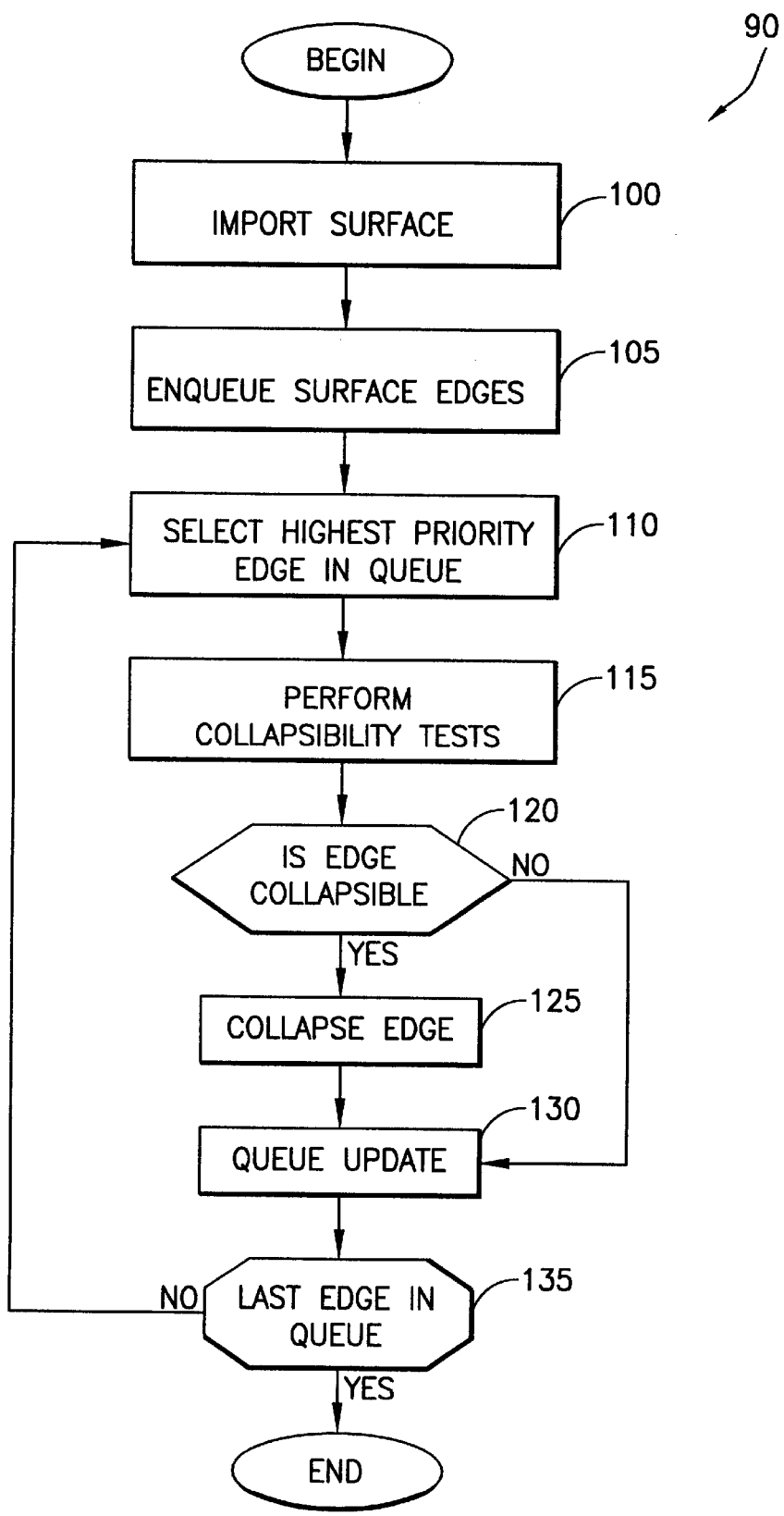
FIG. 1 is a flow chart illustrating a method for automatically generating levels of detail of a surface by performing successive edge collapses.

For the purposes of this description of the invention a polygonal surface or, simply, a surface is defined as a set of vertices V and a set of triangles T. Each vertex of V has n-dimensional coordinates (commonly three dimensional coordinates). Each triangle of T is an ordered triple of vertex indices. An orientation of the triangle is defined by choosing an order for three vertex indices, modulo circular permutations. Two such orderings are possible. An undirected surface edge is a pair of consecutive vertices in any triangle. Such vertices are referred to as endpoints of the edge. The triangle is said to be incident to the edge, and the edge incident to the vertices. Two triangles sharing an edge are said to be adjacent. Two edges sharing a vertex are said to be adjacent. A pair consisting of a triangle and a vertex of the triangle is referred to as a corner. The set of triangles that share a vertex v are referred to as the star of v. The number of triangles in the star of a vertex v is referred to herein as the valence of the vertex v. The link of a vertex v is obtained by linking up all edges bounding the star of v and by discarding from the list of edges so formed the edges incident to v. The link of a vertex is also defined by C. Hoffmann, "Geometric and Solid Modeling", Morgan Kaufmann, 1989, pp. 53–54. If the link has one component, and is not intersecting itself, the vertex v is said to be a regular vertex, otherwise it is a singular vertex. For such a regular vertex, if the link is closed, meaning that the first end point of the first edge of the link is the same as the last end point of the last edge, the vertex is an interior regular vertex, otherwise it is a boundary vertex.

A manifold surface must satisfy the following first condition: (a) two triangles can only intersect at a vertex of each of them, (b) or at an edge of each of them. A second condition that a manifold surface must satisfy is that every vertex should be a regular vertex. This second condition implies that a particular edge can be shared by, at most, two triangles. A manifold surface is considered to be orientable if each triangle can be oriented such that each edge shared by to triangles is listed in the opposite vertex order in the two triangle vertex triples. The surface is oriented if each triangle is oriented, and if the surface is orientable with such triangle orientations.

This invention is described primarily in the context of surfaces that are manifold surfaces, although the use of non-manifold surfaces is not a limitation upon the practice of this invention. For example, techniques are known in the art, such as one described in IBM Research Report RC 20935, for converting a non-manifold surface to a manifold surface.

A surface is preferably represented in computer memory as a list of vertices, 10, i.e., a vertex list and a list of triangles 20, i.e, a triangle list. Preferably, such lists are represented in the computer memory as directly indexed arrays. Each vertex entry in the vertex list preferably contains three coordinates of the vertex, stored in floating point format using the required precision level (single precision or double precision). In addition, several attributes may be associated with vertices, such as vertex colors, normals, texture coordinates, material properties, errors, tolerances, or other scalar or vector data. Such attributes are preferably stored in separate arrays. Triangles may have attributes as well, and so may corners.

Figure 7:
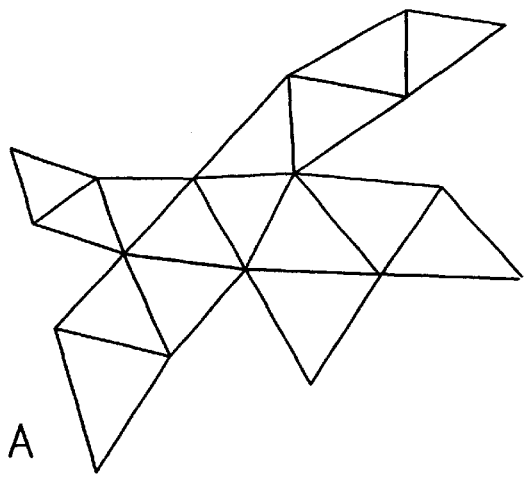
FIG. 7A illustrates an exemplary triangle tree.
FIG. 7B and FIG. 7C illustrate polygonal surfaces that are not triangle trees.
Figure 7:
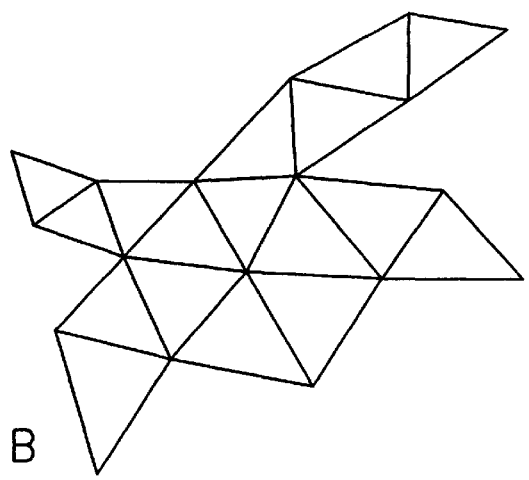
Figure 7:
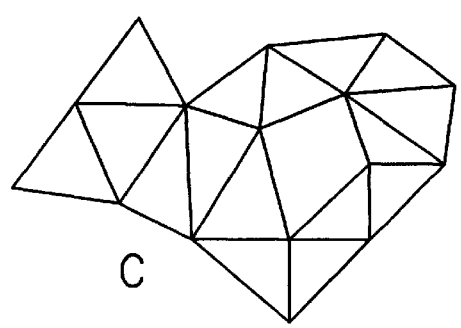
Figure 8:
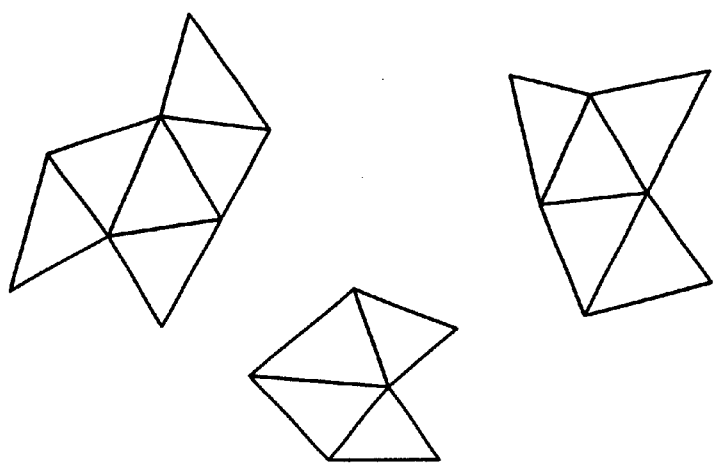
FIG. 8A illustrates an exemplary triangle forest.
FIG. 8B and FIG. 8C illustrate assignments of representatives to vertices when either an interior or a boundary edges are collapsed.
Figure 8:
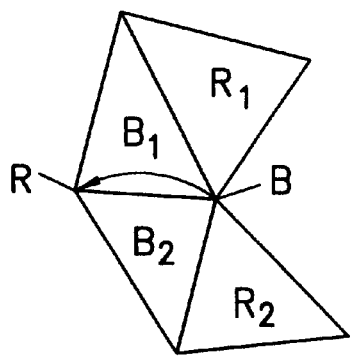
Figure 8:
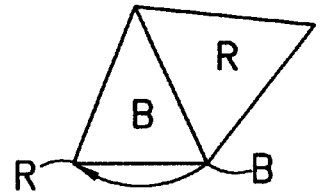

FIG. 7A illustrates an exemplary triangle tree. A tree of triangles, i.e, a triangle tree, is a set of triangles that are completely connected through edges (meaning that it is possible to define a path of triangles from any triangle to any other triangle, such that progressing along the path from one triangle to the next is performed by crossing exactly one edge of the surface), and such that there are no loops of triangles. A more compact definition can be given using concepts from Graph Theory (Graph Theory is developed for instance in Harary's Graph Theory, Addison Wesley, 1969). Triangles are considered to form nodes of a graph, and edges of the graph correspond to edges shared by two triangles. A triangle tree is such that the associated graph is a tree. FIGS. 7B and 7C illustrate surfaces that are not triangle trees. A set of triangle trees is referred to as a forest, as illustrated in FIG. 8A.

Figure 12:
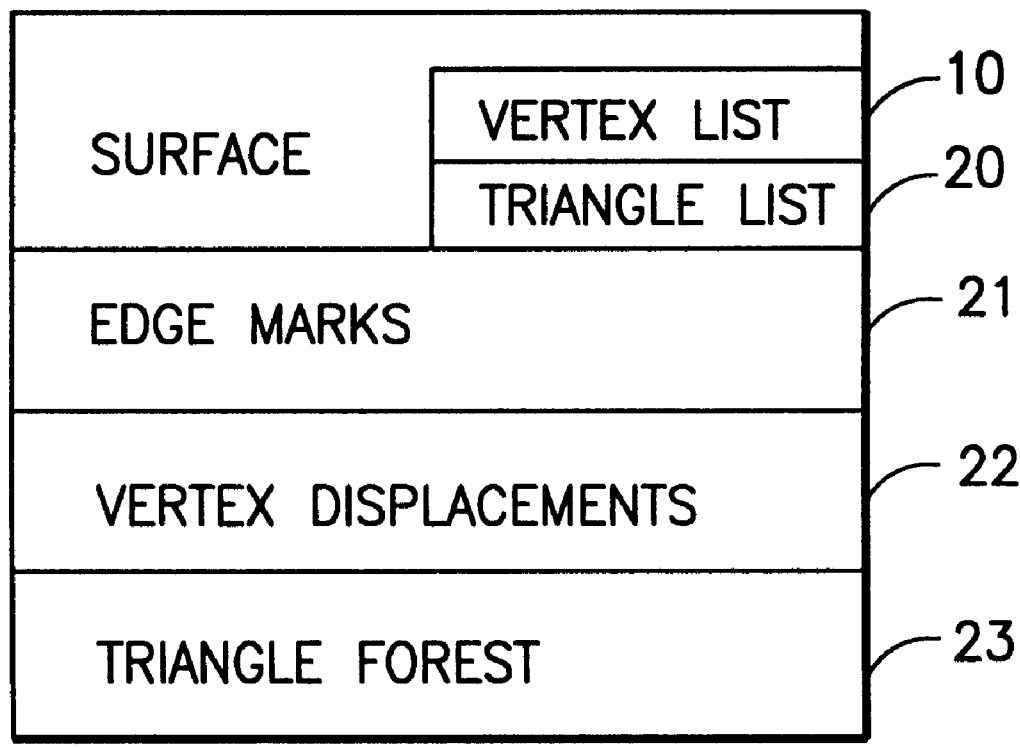
FIG. 12 illustrates a recursive definition of a polygonal surface that is used by this invention.

FIG. 12 illustrates an alternate definition of a surface that is preferably used by the present invention. In this definition, a surface is defined using a base mesh, which is itself a surface, and is preferably represented using a list of vertices 10 and a list of triangles 20, together with a list of edge marks 21, a list of vertex displacements 22, and a triangle forest 23. A vertex displacement is specified using the n-dimensional coordinates (generally three dimensional) of the displacement.

A method for simplifying a polygonal surface, i.e., for starting from a high level of detail of a polygonal surface to produce a low level of detail surface, is described in commonly assigned U.S. patent application Ser. No. 08/742,631, filed Nov. 1, 1996, "Surface Simplification Preserving a Solid Volume and Respecting Distance Tolerances", by A. Gueziec, as well as in IBM Research Report RC 20440, revised May 20, 1997, "Surface Simplification Inside a Tolerance Volume". The teaching of this invention is described primarily in the context of the surface simplification method by A. Gueziec, although the use of the surface simplification method by A. Gueziec is not a limitation upon the practice of this invention. It is to be noted that several other known methods, as well as methods inspired from the surface simplification method, may use similar principles that are reviewed below. It is only important that two principles be respected for the teaching of this invention to be applicable.

The first principle is that surface edges are put in a queue and sorted according to some function for evaluating the edge's importance. Several methods can be used to build a list containing the surface edges from the specification of the triangle list 20. Such methods can be consulted in commonly assigned U.S. patent application Ser. No. 08/742,631 filed Nov. 1, 1996, "Surface Simplification Preserving a Solid Volume and Respecting Distance Tolerances", by A. Gueziec, or in the IBM Research Report RC 20935. This IBM Research Report also describes a local cutting method and a global cutting method, which can be employed by the teachings of this invention as well as described below.

Next, a number of tests are applied to the edge to determine whether it can be safely collapsed, i.e., removed from the surface. Collapsing a surface edge E, as illustrated in FIG. 6B, amounts to bringing together the two endpoints of E to a new position V (new vertex), such that the two triangles sharing E are removed from the surface and the triangles sharing either endpoint of E are modified to share the newly created vertex V.

In Gueziec's method the tests are decomposed into one or more primary collapsibility tests and one or more secondary collapsibility tests. Primary collapsibility tests are performed to determine whether the connectivity of the surface after collapsing the edge is acceptable (i.e., the valence of V is below a specified value and the surface resulting from the collapse is a manifold). Secondary collapsibility tests are performed to determine whether the geometry of the surface after collapsing the edge is acceptable (primarily, such tests are used to determine whether the surface resulting from the collapse deviates from the original surface by more than a specified maximum distance). It should not be assumed that the teaching of this invention relies on the use of only these particular tests, as alternative tests can be used as well.

In a preferred embodiment of this invention, additional tests are introduced after the primary collapsibility tests and before the secondary collapsibility tests. However, the particular order in which the series of tests are applied is not a limitation on the present invention. It should be noted that respecting the first principle is possible for many methods that simplify a polygonal surface, not only for the above-described method.

The second principle that is respected for the teaching of this invention to be applicable is that a mapping is maintained during the simplification process between the original surface and the simplified surface, such that the image of each vertex is a vertex, and the image of each triangle is either a vertex, an edge, or a triangle. This mapping is related to the notion of a simplicial mapping defined in Agoston's "Algebraic Topology", Marcel Dekker, Inc. 1976. Preferably, the mapping can be implemented by defining the representative of a vertex as explained below, where each vertex maps to its representative.

For the sake of description, collapsed triangles and vertices are referred to as "blue triangles" and "blue vertices" and remaining triangles and vertices are referred to as "red triangles and red vertices". The applicability of the present invention does not, however, rely on the use of colors, as other designations can be used as well. Originally all vertices and triangles are red (R). During the simplification process the vertices and triangles that are removed to form the simplified surface are blue (B).

FIG. 8B illustrates a preferred method for assigning the representatives of vertices during an interior edge collapse. When Edge R-B collapses, the representative of vertex B (Blue) is determined to be Vertex R (Red). Using such representative assignments, the vertices belonging to the simplified surface can be recognized as the vertices that are their own representatives. The triangles of the simplified surface can be recognized as the triangles such that all three vertex representatives are different. Alternatively, the vertices of the simplified surface can be recognized as the vertices that are red, and the triangles of the simplified surface can be recognized as the triangles that are red. Thus, a simplified surface can be described using a subset of the vertices and a subset of the triangles of the original surface. FIG. 8C illustrates a preferred representative assignment when a boundary edge R-B is collapsed.

It should be noted that respecting the second principle is possible for many methods that simplify a polygonal surface, not only for A. Gueziec's method.

Figure 9:
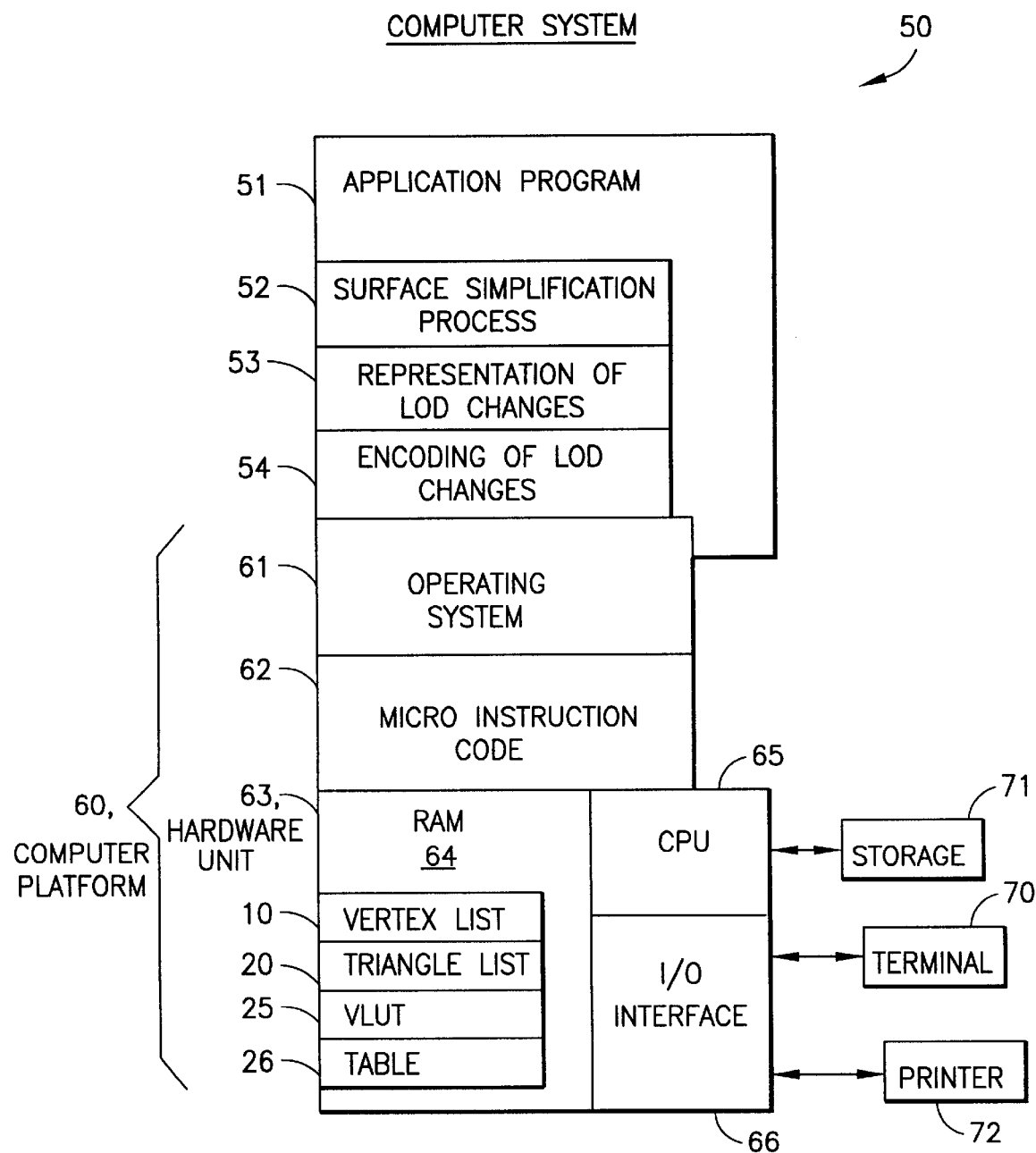
FIG. 9 is a block diagram showing a computer system on which a preferred embodiment of the present invention operates.

FIG. 9 is a block diagram showing an exemplary computer system 50 on which preferred embodiments of the methods of this invention operate. The preferred embodiment includes one or more application programs 51. The application programs 51 operate on a computer platform 60 which includes a hardware unit 63. Some application programs 51 that run on the computer system 50 include, according to the present invention, a surface simplification process 52, a process for representing LOD changes 53, and a process for encoding LOD changes 54. The processes 52, 53, and 54 are described in detail below.

The hardware unit 63 includes one or more central processing units (CPU) 65, a random access memory (RAM) 64, and an input/output interface 66. Microinstruction code 62, for instance a reduced instruction set, may also be included on the platform 60. Various peripheral components may be connected to the computer platform 60, including a graphical interface or terminal and user interface 70, a data storage device 71, and a printing device 72. An operating system 61 coordinates the operation of the various components of the computer system 50. An example of computer system 50 is the IBM RISC System/6000 (RISC System/6000 is a trademark of the International Business Machines Corporation.) It is readily understood that those skilled in the computer arts will be familiar with many equivalent computer systems 50, and the teachings of this invention are not intended to be limited for use with any one particular type of computer or computer architecture.

The RAM memory 64 is shown containing a plurality of tables and arrays which are employed during the operation of the methods of this invention. It should be realized that these tables and arrays could as well be maintained in the data storage unit 71, or on both the RAM 64 and data storage unit 71.

An aspect of this invention is a computer method for automatically generating surface level of detail changes. The computer method preferably comprises the following steps.

Referring to FIG. 1, in Step 100 the method imports the polygonal surface inside the computer memory. In Step 105 the method identifies and enqueues the surface edges according to a priority level defined for each edge. In Step 110 the method selects the highest priority edge inside the priority queue. In Step 115 the method performs collapsibility tests on the highest priority edge. In Step 120 the method determines whether the edge has passed the collapsibility tests of Step 115 and if so proceeds to Step 125, otherwise the method proceeds to Step 130. In Step 125 the edge under consideration is collapsed. In Step 130 the method updates the queue of edges to reflect the changes that occurred after removing the edge from the queue and potentially collapsing the edge in Step 125. In Step 135 a determination is made whether the edge is the last edge remaining in the queue. If it is the method terminates, otherwise the method returns to Step 110 to process the next edge in the queue.

Figure 2:
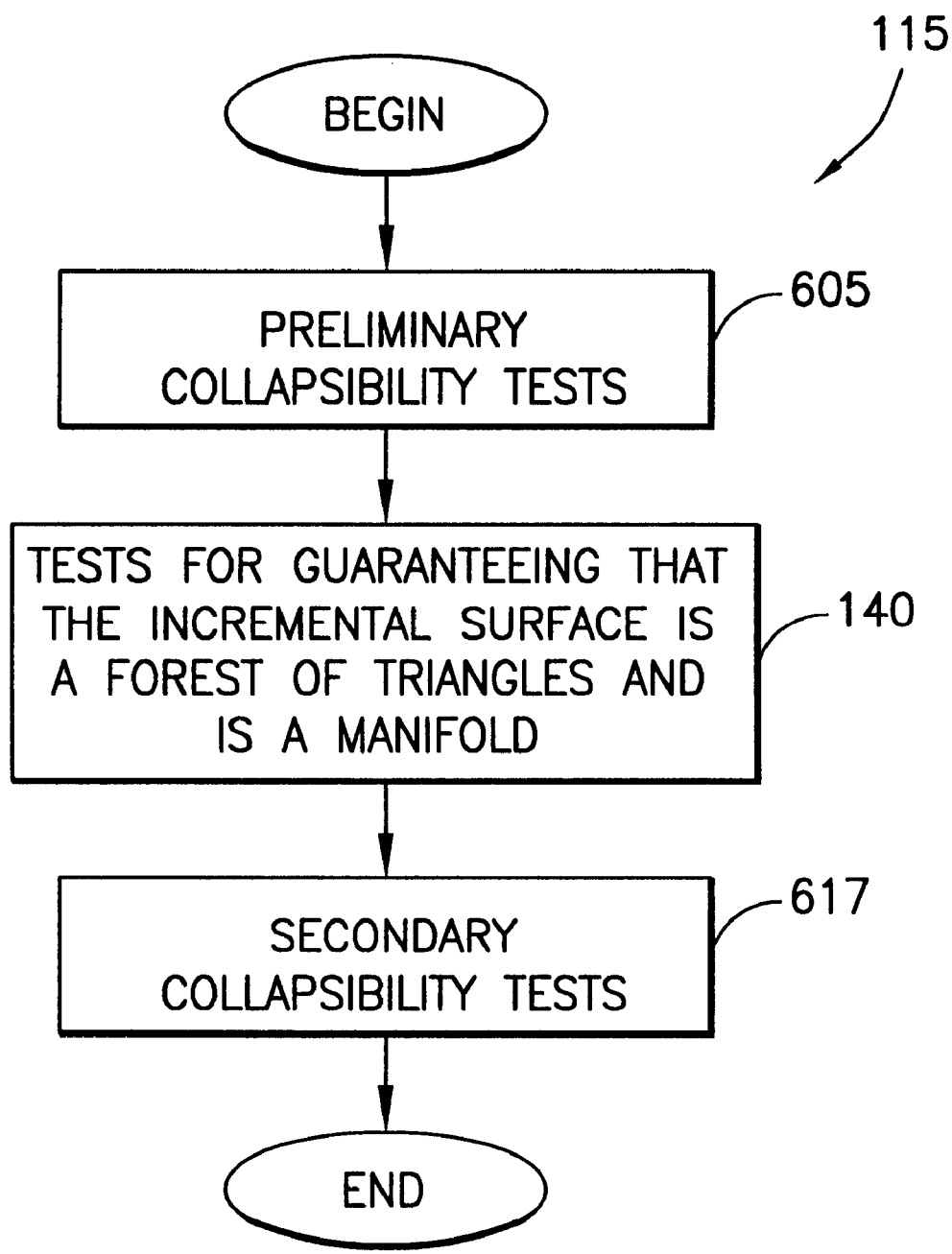
FIG. 2 is a flow chart illustrating tests for determining whether a given edge is collapsible.

Referring to FIG. 2, the Step 115 of FIG. 1 is shown in greater detail. In Step 605 the primary collapsibility tests can be performed as described in the above referenced commonly assigned U.S. patent application Ser. No. 08/742,, filed Nov. 1, 1996, "Surface Simplification Preserving a Solid Volume and Respecting Distance Tolerances", by A. Gueziec.

Figure 10:
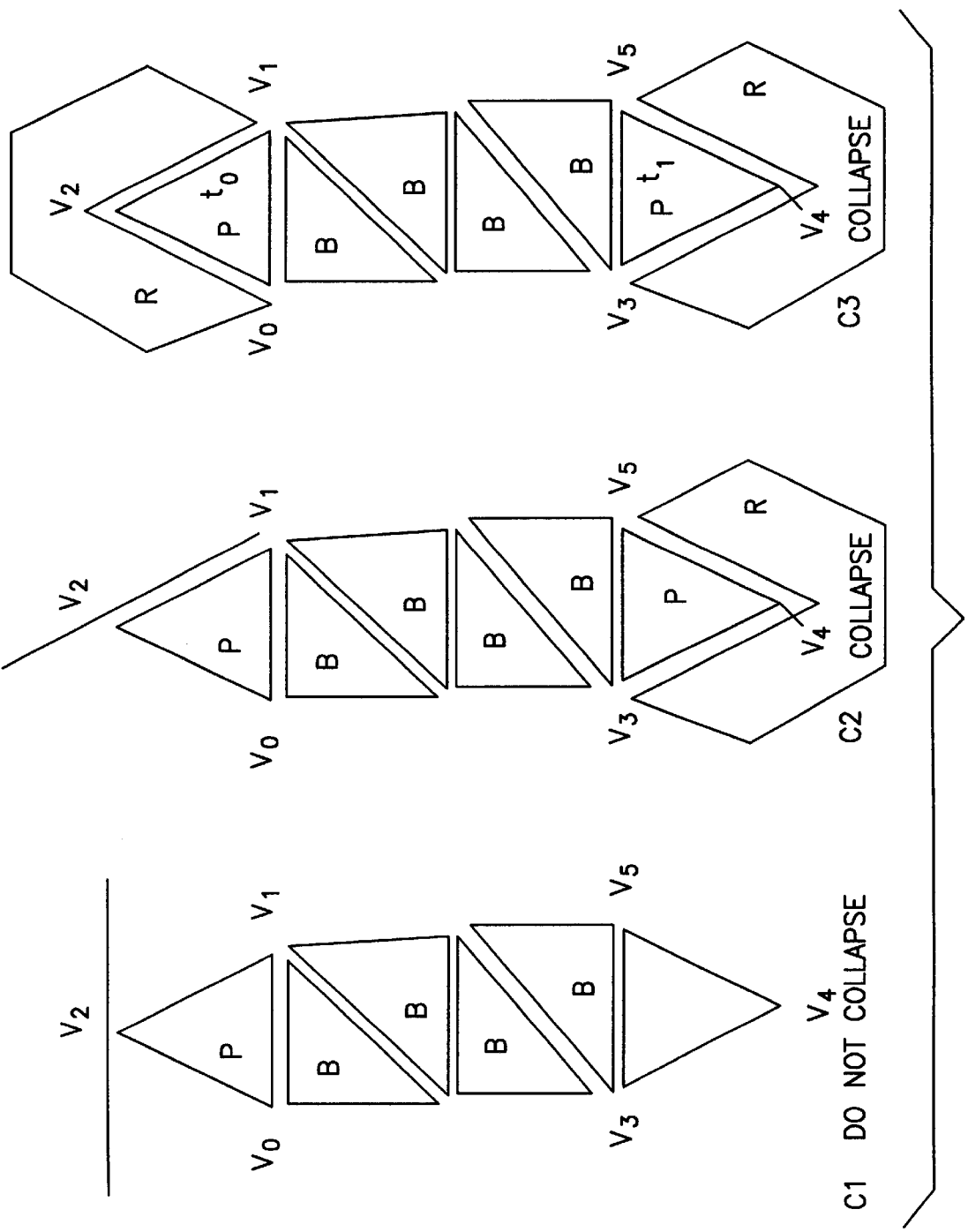
FIG. 10 is a diagram illustrating Steps 210 through 235 of the comprehensive test of FIG. 4.
Figure 11:
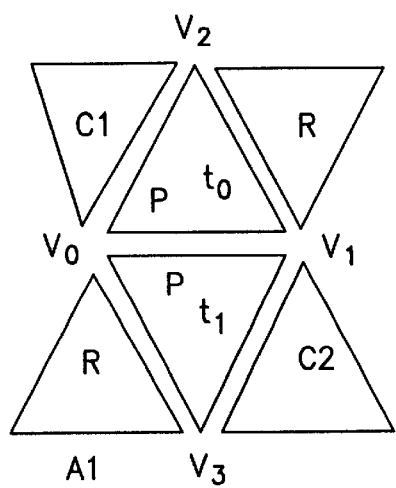
FIG. 11-A1 and FIG. 11-A2 illustrate Steps 245 through 255 of FIG. 4 where triangles to and ti are adjacent to two highlighted triangles (Case A).
Figure 11:
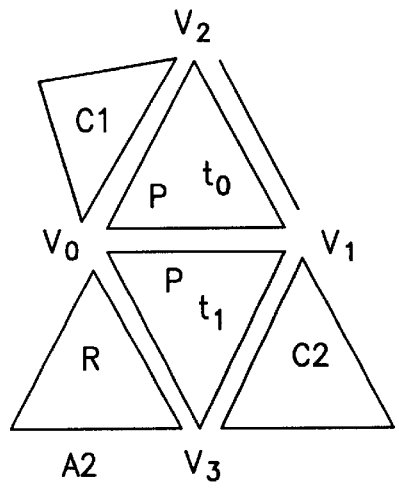
Figure 11:
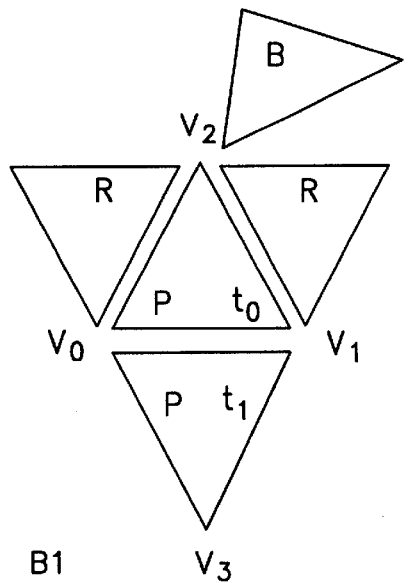
Figure 11:
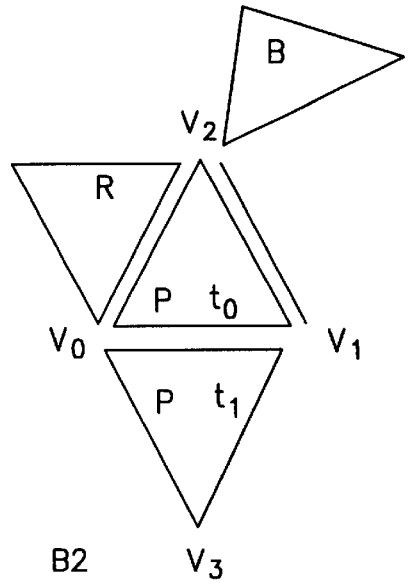

As was described above, for ease of description a collapsed triangle is referred to as a "blue triangle" (noted with a B in FIG. 10 and FIG. 11) while a triangle that remains in the next simplification level is referred to as a "red triangle" (noted with an R in FIG. 10 and FIG. 11). A triangle that is under test is referred to as a "purple triangle" (noted with a P in FIG. 10 and FIG. 11). In addition, a "red surface" or "split surface" is the surface containing the collection of all red triangles, and a "blue surface" or "incremental surface" is the surface containing the collection of all blue triangles.

In Step 140, and in accordance with an aspect of this invention, the method performs tests for guaranteeing that the incremental surface is a forest of triangles and is a manifold.

In Step 617, the method performs the secondary collapsibility tests, such as those described in the commonly assigned U.S. patent application 08/840,001, filed on Apr. 24, 1997, entitled "Method to Convert Non-Manifold Polyhedral Surfaces into Manifold Surfaces" by A. Gueziec and G. Taubin.

Figure 3:
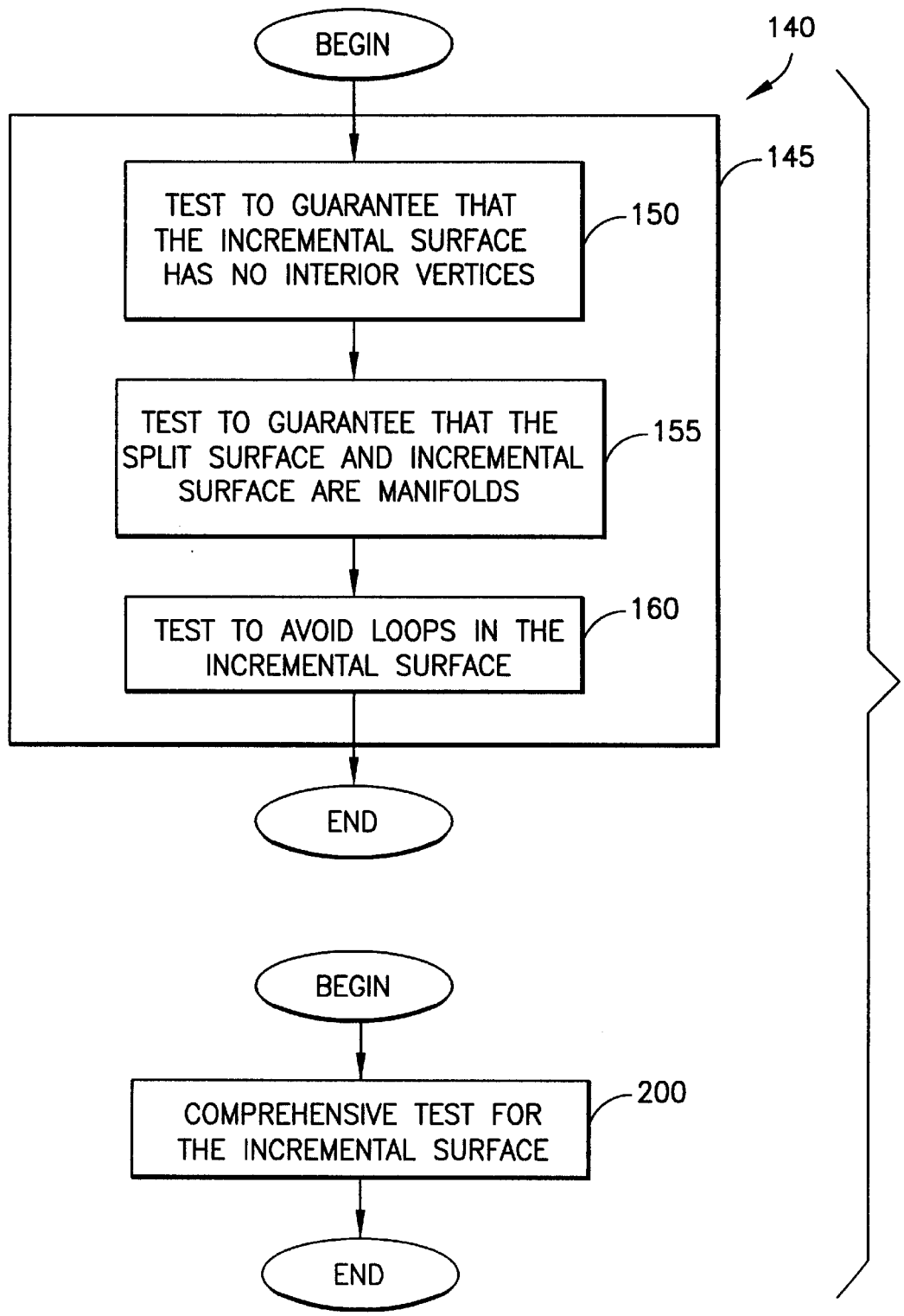
FIG. 3 is a flow chart illustrating two alternative tests for determining whether an incremental surface is a forest of triangles and a manifold after applying the potential edge collapse.

Referring to FIG. 3, in Step 150 the method performs a test to verify that the incremental surface has no interior vertices. The notation used for vertices and triangles is explained in FIGS. 10 and 11. The method maintains a count of the number of removed (blue) triangles incident to each vertex. The following test is used on the vertices labeled v0, v1, v2, v3, v4 and v5 in FIGS. 10 and 11: count the number of times that each vertex occurs in the purple triangles t0 and t1 (once or twice); and this number must be larger than the number of remaining faces that share the vertex. Boundary vertices are not tested.

In Step 155 the method performs a test to verify that the split surface and incremental surface are manifolds, as defined above.

The following test is performed on the vertices v0, v1, v2, v3, v4 and v5. If the vertex is an interior vertex (not a boundary vertex) the method rotates about the vertex in clockwise fashion until a number of faces have been visited that is equal to the valence of the vertex, while counting the face color changes across edges. A maximum of two color changes (from red to blue or blue to red) can be observed. If the vertex is a boundary vertex, the method rotates about the vertex in clockwise fashion until the boundary is encountered, then rotates in a counter-clockwise fashion until either the boundary is encountered or the total number of faces visited equals the vertex valence. For a boundary vertex, a single change of color is allowed at interior edges only, not counting the changes of color on the boundary.

In Step 160 of FIG. 3 the method performs a test to avoid creating loops of triangles in the incremental surface. This test is used in combination with the second test of step 155. The method first considers the purple (P) triangles to and ti, and retrieves all of the triangles sharing an edge with either t0 or t1. For each blue (collapsed) triangle, the method retains a "blue component representative 700", that indicates to which connected component of the blue surface it belongs. Two cases are distinguished: either the two purple triangles t0 and t1 share an edge, or they do not. If they do share an edge, then retrieve the four adjacent triangles to t0 and t1, and the blue component representative of each triangle. All the representatives must be different. In the case where t0 and t1 do not share an edge, then no test is necessary. Note that the purple triangles must be connected by a path of blue triangles. If one assumes that the second property of having a manifold incremental and split surfaces holds, since the blue triangles form a manifold surface, there is at most one component of removed triangles connected to the purple triangles.

In Step 200 of FIG. 3 the method performs a comprehensive test for the blue surface to verify that three properties are simultaneously satisfied: (1) that the blue surface has no interior vertices; (2) that the blue and red surfaces are both manifolds; and (3) that the blue surface has no loops of triangles.

Figure 4:
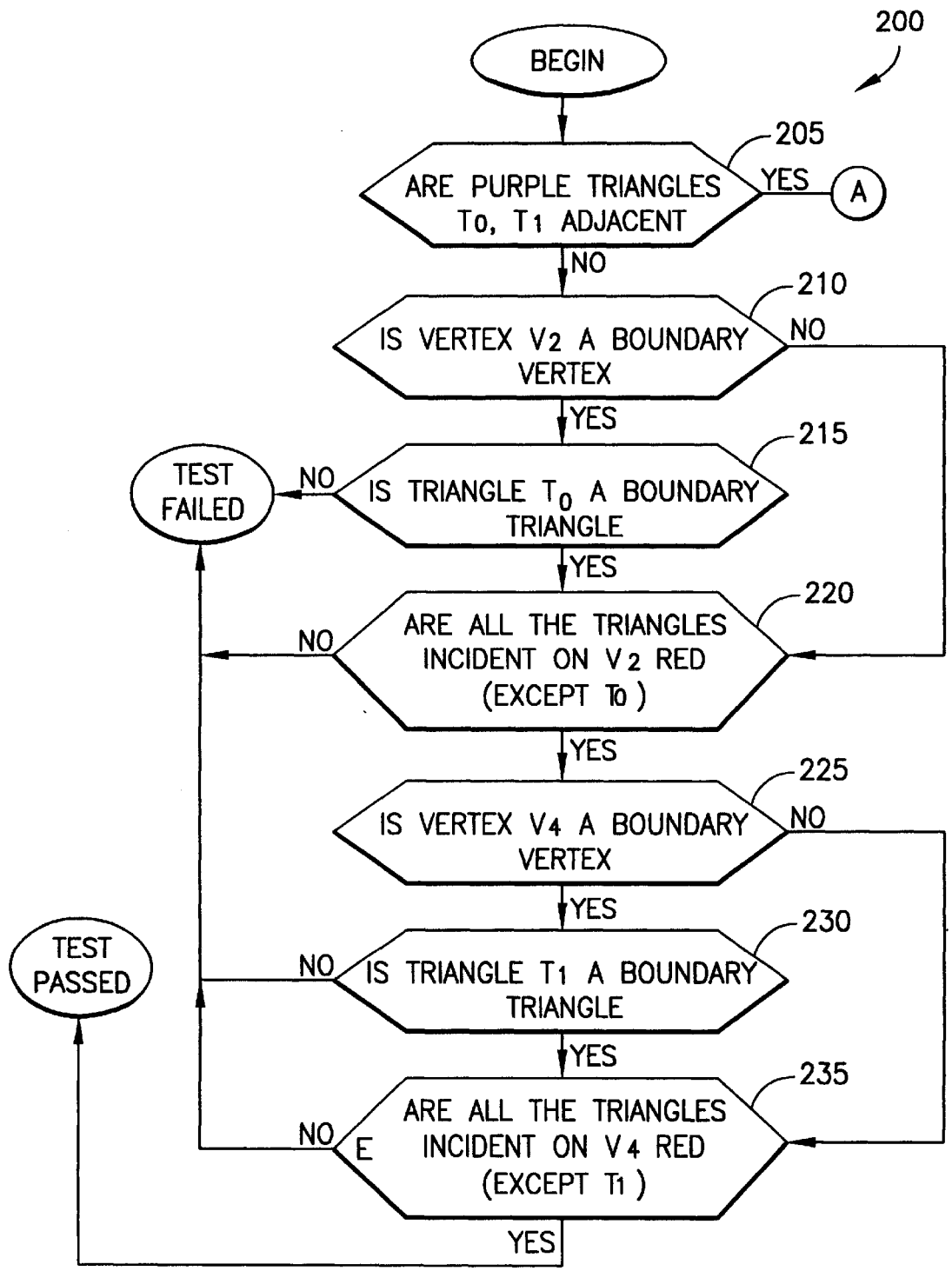
FIG. 4 is a flow chart illustrating a comprehensive test for determining whether the incremental surface is a forest of triangles and a manifold after the potential edge collapse.
Figure 5:
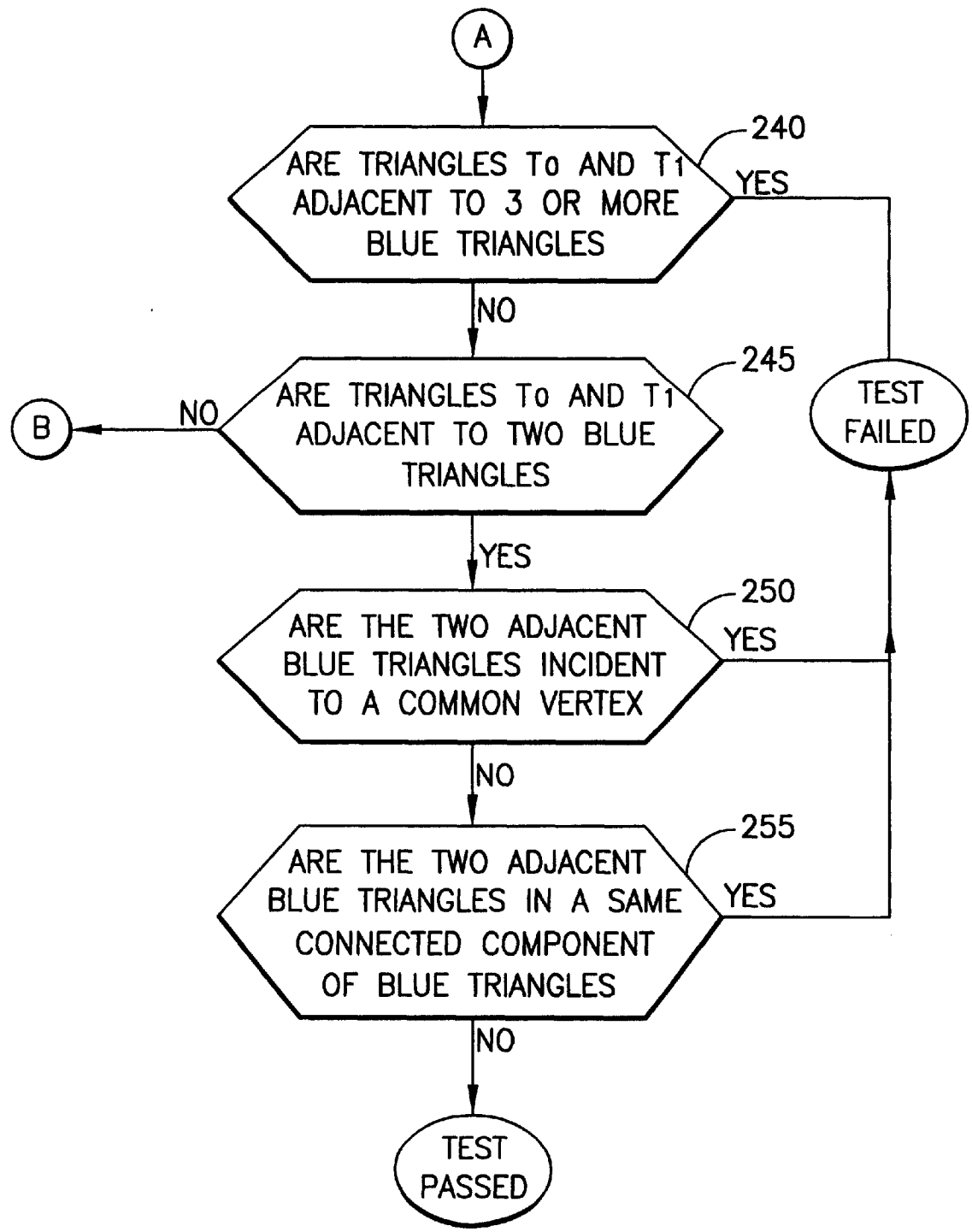
FIG. 5 is a flow chart illustrating a particular case A of the comprehensive test of FIG. 4.

Referring now to FIG. 4, in Step 205 the method tests whether the triangles t0 and t1 are adjacent, as depicted in FIG. 11. If t0 and t1 are adjacent the method proceeds to Step 240 (FIG. 5), otherwise the method proceeds to Step 210. In Step 210, the method tests whether vertex v2 belongs to the boundary of the surface. Boundary vertices are identified in the beginning of the process by their property of being incident to boundary edges, as defined above. If v2 belongs to the boundary the method proceeds to Step 215, otherwise the method proceeds to Step 220. In Step 215, a test is made as to whether to is a boundary triangle. It is determined if a given triangle is a boundary triangle if and only if it is incident to at least one boundary edge. If to is a boundary triangle, the method proceeds to Step 220 (this is illustrated by Case C2 in FIG. 10), otherwise the test has failed and the method returns to Step 617 in FIG. 2 (this is illustrated by Case C1 in FIG. 10).

In Step 220 a test is made as to whether all of the triangles incident on vertex v2, except triangle t0, are red. If this is the case the method proceeds to Step 225 (this is illustrated by Case C3 in FIG. 10), otherwise the test has failed and the method returns to Step 617 in FIG. 2. In Step 225 a test is made to determine whether vertex v4 is a boundary vertex. If this is the case, the method proceeds to Step 230, otherwise the method proceeds to Step 235. In Step 230 a test is made to determine whether triangle t1 is a boundary triangle. If this is the case the method proceeds to Step 235, otherwise the test has failed and a return is made to Step 617 of FIG. 2.

In Step 235 a test is made to determine whether all of the triangles incident on vertex v4, except triangle ti, are red. If this is the case the test passes and the method returns to Step 617 (this is illustrated by Cases C2 and C3 in FIG. 10), otherwise the test fails and the method returns to Step 617 of FIG. 2.

From Steps 240 to 260 (FIGS. 5 and 6A) the method treats the particular case in which t0 and t1 are mutually adjacent, which is illustrated in FIG. 11. In Step 240 a test is made to determine whether triangles t0 and t1 are adjacent to three or more blue triangles. If this is the case the test failed and the method returns to Step 617 of FIG. 2, otherwise it proceeds to Step 245. In Step 245 a test is performed to determine whether triangles t0 and t1 are adjacent to exactly two blue triangles. If this is the case the method proceeds to Step 250, otherwise Step 260 (FIG. 6A) is executed next. In Step 250 a test is made to determine whether the two blue triangles are incident to a common vertex among vertices v0, v1, v2 and v3, as defined in FIG. 11. If this is the case the test fails and a return is made to Step 617. Note that in this case either the common vertex is a boundary vertex, that is necessarily a non-manifold vertex, and the current situation would be prevented by previous tests, or the common vertex is an interior vertex, and changing the color of the purple triangles to blue would make the common vertex an interior vertex of the blue surface. If the test at Step 250 does not fail the method proceeds to Step 255 where a test is performed to determine whether the two adjacent blue triangles belong to the same connected component of blue triangles, as indicated by the blue component representative. If this is the case the test fails and the method returns to Step 617 (this situation is illustrated with Cases A1 and A2 of FIG. 11). Otherwise the test passes and the method returns to Step 130.

Figure 6A:
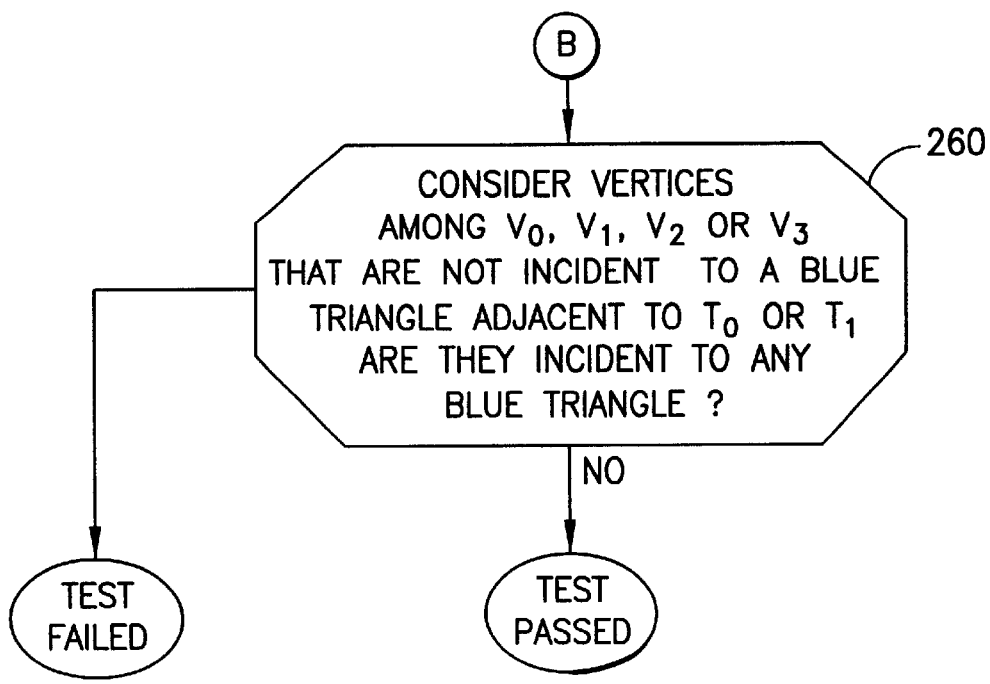
FIG. 6A is a flow chart illustrating a particular case B of the test of FIG. 4.
Figure 6B:
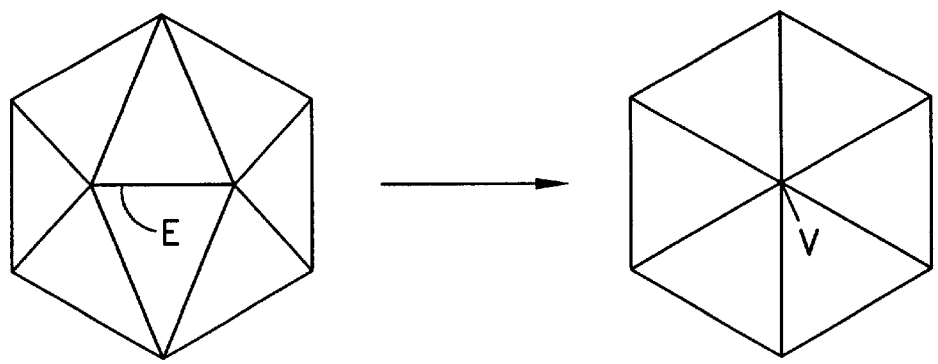
FIG. 6B illustrates the operation of collapsing a surface edge E.

Step 260 of FIG. 6A is illustrated by Cases B1 and B2 of FIG. 11. Among the vertices v0, v1, v2 and v3 consider the vertices that are not incident to a blue triangle that is adjacent to either t0 or t1. Such vertices must not be incident to any blue triangle at all, independent of whether t0 or t1 are boundary triangles or are not (in Case B2, t0 is a boundary triangle). If this is the case, the test passes and a return is made to Step 617, otherwise the test fails and a return is made to Step 130.

Figure 13:
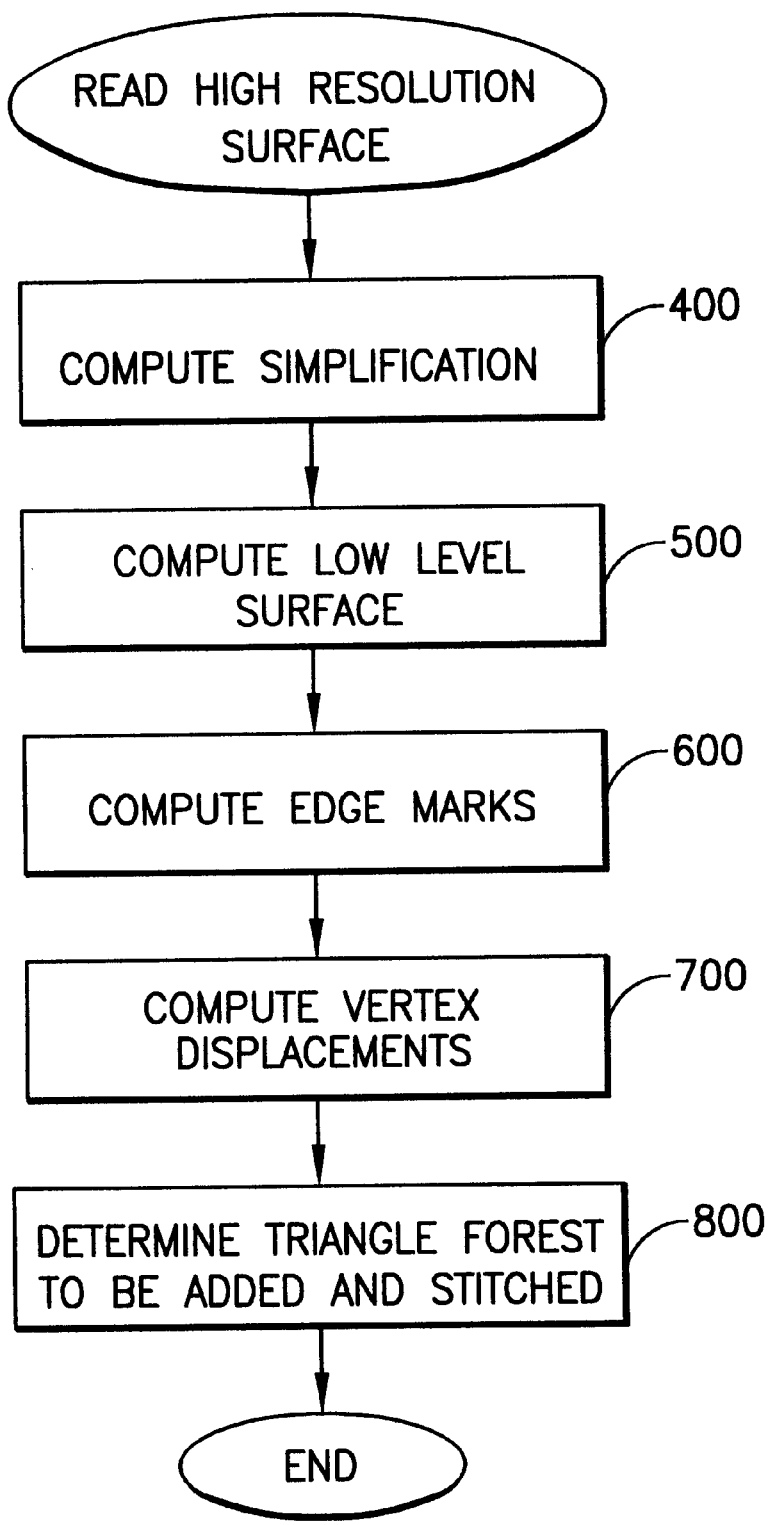
FIG. 13 is a flow chart illustrating the steps to generate a representation of a level of detail change between two polygonal surfaces.
Figure 14:
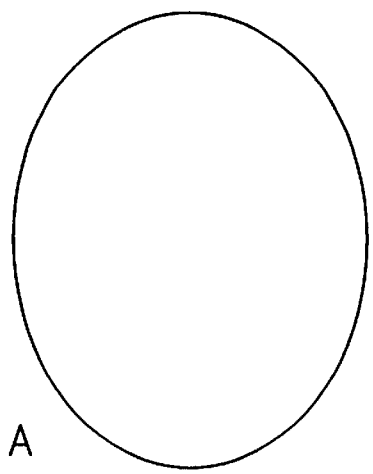
FIGS. 14A through FIG. 14E are diagrams illustrating the steps for applying a change in the level of detail of a surface.
Figure 14:
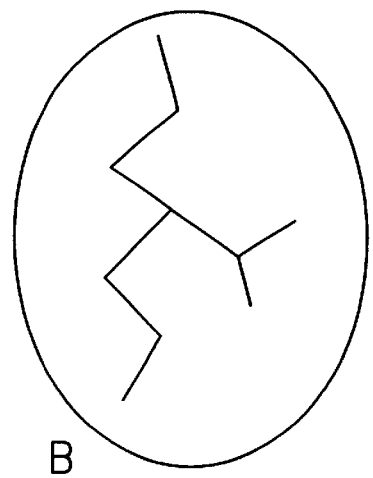
Figure 14:
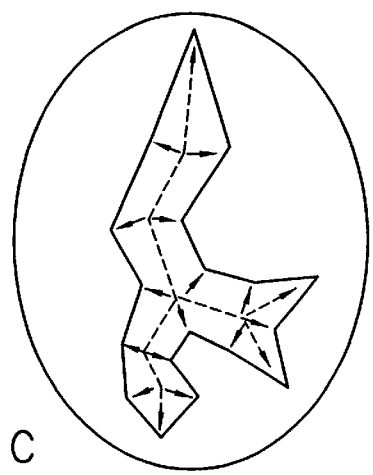
Figure 14:
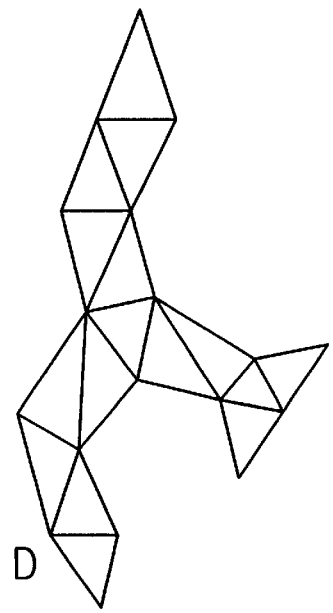
Figure 14:
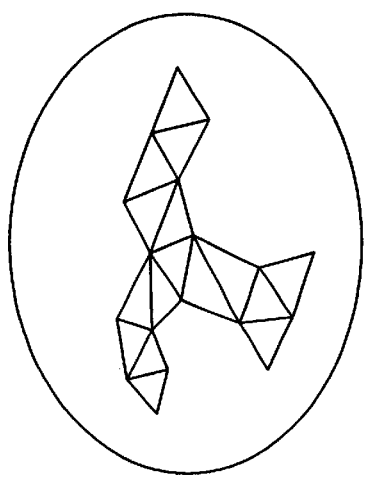

Another aspect of this invention is a computer implemented method for representing the surface level of detail changes using a surface, edge marks, vertex displacements, and a triangle forest, as shown in FIG. 12. The representation of FIG. 12 is used in lieu of representing the level of detail changes using a simplified polygonal surface and an original, full resolution, polygonal surface as described in the prior art. The computer method preferably entails the following steps, as shown in FIG. 13.

After reading the high resolution surface, in Step 400 a polygonal simplification is computed as described above. After the polygonal simplification process is completed a partition of the surface triangles into blue and red triangles is obtained. In Step 500, the lower LOD surface is computed. This step can be accomplished as described in the commonly assigned U.S. patent application "Surface Simplification Preserving a Solid Volume and Respecting Distances Tolerances" and also in the above-referenced IBM Research Report RC 20440. Red vertices and triangles are preferably re-enumerated (assigned new vertex IDs) according to their original order in the original vertex list 10 and triangle list 20. For each red triangle, each vertex index is replaced with the new vertex ID of its representative. A vertex look up table "vlut" 25 is created that stores for each red vertex ID its new ID.

In Step 600 the edge marks 21 are computed. In a first stage of Step 600 a method for enumerating edges (assigning IDs to the edges) in the lower LOD surface is preferably invoked. Any suitable method can be used, provided that a clear convention is decided upon and respected both by the method that executes Step 600, and by the method that uses the lower LOD surface and applies an LOD change using the representation defined by the present invention. The following method is preferably employed: edges are represented using both vertex IDs of the two endpoints; and such pairs of IDs are enumerated in a lexicographic fashion, with the highest ID coming first. For example, the four (undirected) edges represented with the four pairs of vertex IDs (1,3), (5,4), (6,8) and (5,3) are assigned IDs as follows:

ID edge representation
0 (8,6)
1 (5,4)
2 (5,3)
3 (3,1)

Other conventions can be used as well.

In a second stage of Step 600 a list of the surface edges that share both a red and a blue triangle (referred to as red-and-blue edges) is constructed by looping on the surface edges. For each red-and-blue edge, vlut 25 entries of the edge endpoints are retrieved. For each pair of such entries (that are different), an edge ID is determined as specified in the first stage of Step 600. A list of edge IDs is thus determined and provided as the edge marks 21 of FIG. 12.

In Step 700 the vertex displacements 22 are computed. In a first stage of Step 700, the lower LOD surface is cut through the edges that were marked (edge marks 21) in Step 600. This is preferably accomplished by using one of the techniques described in the IBM Research Report RC 20935. After the lower LOD surface has been cut, as visualized in FIG. 17C, the vertices that are introduced are assigned new vertex IDs.

It should be noted that after cutting through the marked edges the number of vertices in the surface is the same as the number of vertices in the higher LOD surface. This is because the blue surface and red surfaces are manifolds, and also because the blue surface is a forest of triangles, as guaranteed in Step 400. A presently preferred method for assigning new vertex IDs to the vertices introduced after cutting through marked edges assigns the same IDs as the vertices in the higher LOD surface (since the surfaces have the same number of vertices).

Three suitable methods for assigning new vertex IDs to the vertices introduced after cutting through marked edges are now described. Other methods could be used as well.

A first method is described in the IBM Research Report RC 20935 as a Local Cutting Method. In the Local Cutting Method vertices incident to a marked edge are visited in the order in which they are listed in the original vertex list 10. Then, vertices are multiplied, i.e., for each vertex, incident triangles are assigned to groups, such that each group is connected using non-marked edges. A standard connected components algorithm may be used for assigning group numbers. Several conventions can be chosen to decide which group is assigned which group number; preferably, the group with the triangle of lowest ID is assigned number 0, the group with the triangle of next higher ID is assigned number 1, and so on. Then, for each group different from the group number 0, a new vertex ID is created, by preferably adding one to the highest vertex ID that is currently assigned.

The second method for assigning new vertex IDs is described in the IBM Research Report RC 20935 as a Global Cutting Method. In the Global Cutting Method each triangle is first disconnected from every other and triangle corner numbers are used to identify each resulting vertex. Then, vertices (triangle corners) are grouped two pairs at a time, corresponding to pairs of corners incident to non-marked regular edges in the input surface (i.e., the surface before disconnecting triangles). The grouping process utilizes an array of corner representatives, that are originally the corners themselves, and subsequently one corner that is chosen to be representative of the group. For example, the corner with the lowest ID can be chosen to be representative of the group. At the termination of the grouping process, each group of corners is replaced with a vertex, and vertex IDs are assigned in the order in which the corner group's representatives IDs are listed in the original triangle list 20.

Figure 15:
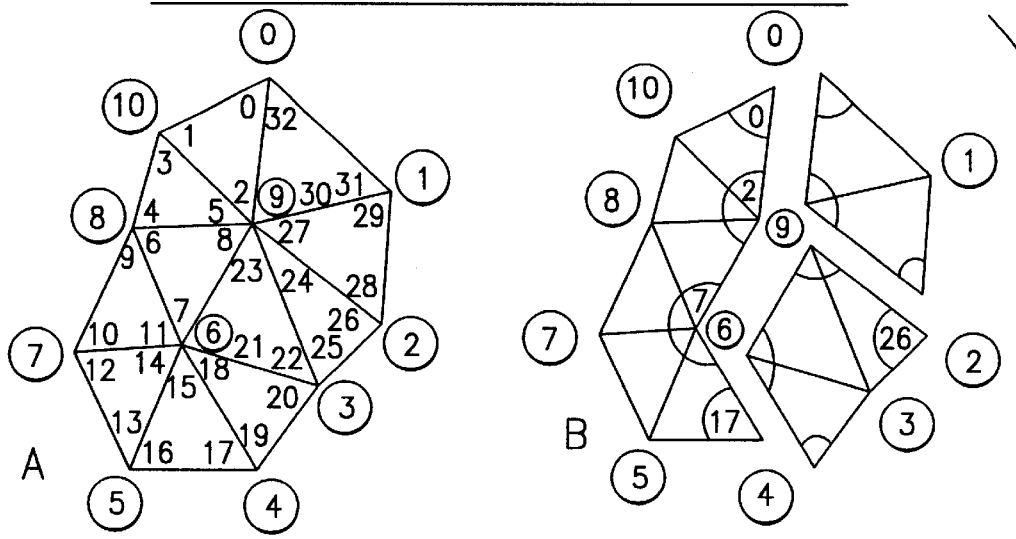
FIG. 15A through FIG. 15C illustrate a method for re-enumerating surface vertices after cutting through marked edges.
Figure 15:
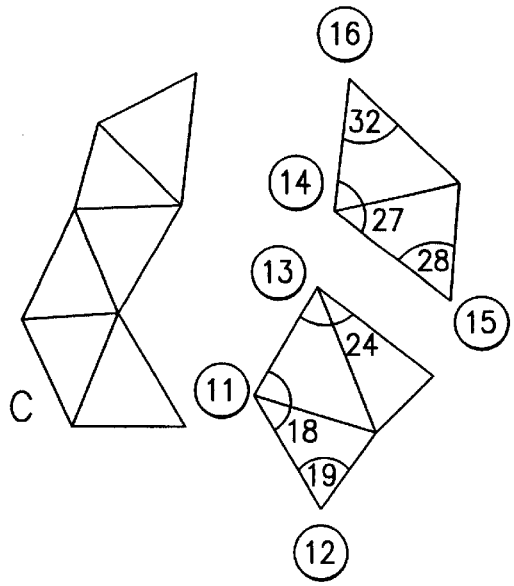

The third method for assigning new vertex IDs is illustrated in FIG. 15A, FIG. 15B, and FIG. 15C. Corner groups are determined as indicated above in the second method. The representative of a corner group is chosen to be the corner of lowest ID. For each vertex for which the associated number of corner groups is larger than one (that must be multiplied), the corner group of lowest ID is replaced with the vertex. For example, in FIG. 15B the corner group with ID 2 is replaced with the vertex with ID 9. The remainder of the corner groups are added to a list of corner groups to be replaced. The list of corner groups to be replaced is then ordered according to the corner group IDs. Each corner group of the list is replaced with a new vertex. The new vertex ID is determined to be one plus the highest vertex ID currently assigned.

This third method is related to the first two methods, with a fixed convention for assigning IDs to corner group representatives, and a fixed convention for assigning IDs to vertices replacing the corner groups. This is illustrated in FIG. 15C.

Returning now to FIG. 13, in a second stage of Step 700 a one to one mapping is determined between the vertices of the red-and-blue edges in the higher LOD surface and the boundary vertices after cutting the lower LOD surface through marked edges 21, as illustrated in FIG. 17D.

As will be remembered from the discussion of Step 500, for each vertex of the higher LOD surface the ID of the representative of the vertex in the lower LOD surface was stored in the vlut 25. This relationship is illustrated in FIG. 17A and in FIG. 17B, where representatives are shown using arrows. After removal of the blue triangles in Step 500, and re-enumeration of the resulting vertices, a loop of red-and blue edges (shown as a heavy line in FIG. 17A) is transformed to a tree of edges shown as a heavy line in FIG. 17B.

There is at least one endpoint of the marked edges 21 obtained in FIG. 17B that is representative of a single vertex, for example the vertex 6 in FIG. 17A. In this case the representative of vertex 6 is a marked edge endpoint with ID 8 in FIG. 17B. After cutting through the marked edges and assigning new IDs to the vertices that were created, according to the third method for assigning IDs, the ID of vertex 8 is unchanged.

A convention is decided upon for choosing a vertex origin in a closed loop of edges. Preferably, the vertex whose ID is the lowest (see FIG. 16) is chosen. However, this particular choice is not a limitation upon the practice of this invention, as other conventions could be used as well.

Another convention is decided upon for choosing an orientation of closed loops of surface boundary edges, as well as closed loops of red-and-blue edges. As shown in FIG. 17C, such loops are preferably oriented such that red triangles are on the right side of the edges.

Knowing that the vertex 6 in FIG. 17A and the vertex 8 of FIG. 17C correspond to each other, a table 26 is preferably built for storing a one to one mapping between the vertices of red-and-blue edges in FIG. 17A and the boundary vertices obtained after cutting through the marked edges 21 in FIG. 17C. The algorithm starts from vertex 6 (respectively vertex 8) and traverses both loops following the orientation convention described above.

Using the table 26, each vertex of the loop of FIG. 17C is considered in turn, and a vector of the displacement between the position of the vertex in the higher LOD surface and the position of the vertex representative in the lower LOD surface is stored. It should be noted that for illustrative purposes the loop of FIG. 17C is shown to be geometrically different from the tree of marked edges of FIG. 17B, whereas in fact it is not since no vertex displacements were applied at this point. Such vertex displacements are stored as a closed loop of vertices starting from the origin of the loop in FIG. 17C, that is, according to the aforementioned preferred convention, vertex 1.

In Step 800 of FIG. 13 the triangle forest 23 to be added and stitched to the lower LOD surface is determined.

Figure 17:
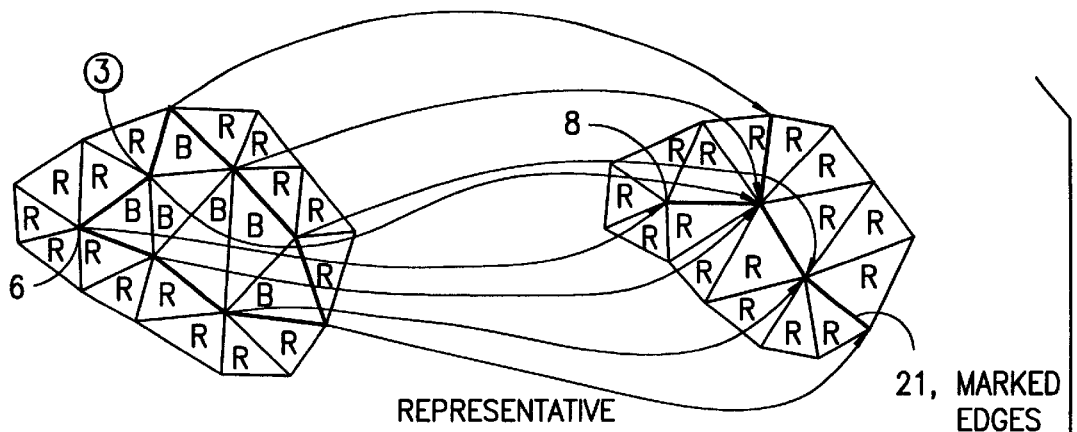
FIG. 17A through FIG. 17C illustrate the principle that is used to build a one to one mapping between the vertices of certain edges in the higher LOD surface and the vertices of the loops obtained in the lower LOD surface after cutting through marked edges.
FIG. 17D illustrates a table 26 used for storing a one to one mapping between the vertices of the certain edges in the higher LOD surface and the corresponding vertices of the loops obtained by cutting through marked edges in the lower LOD surface.
Figure 17:
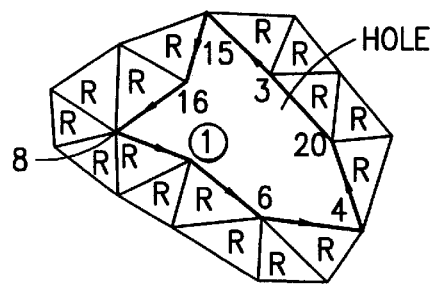

Returning to FIG. 17, in a first stage of Step 800 the table 26 is used to determine the vertex 5 in the higher LOD surface corresponding to the origin vertex 1 in FIG. 17C. A triangle tree is built with an origin vertex positioned at vertex 5 and an origin edge with endpoints 5 and 9. A triangle tree specifies how the polygonal hole or region (see FIG. 17C) formed by the cutting of Step 700 should be triangulated. Several methods can be used to specify a triangle tree.

Figure 18:
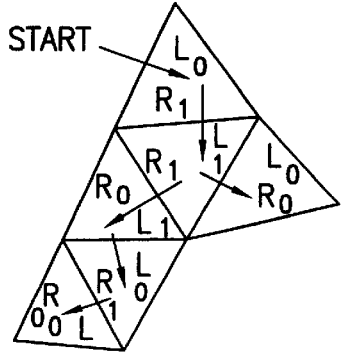
FIG. 18A illustrates a first method for representing a triangle tree.
FIG. 18B illustrates a second method for representing a triangle tree.
Figure 18:
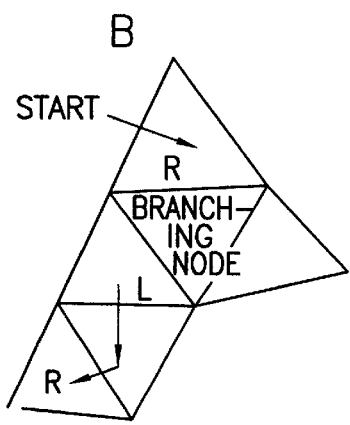

One suitable method is illustrated in FIG. 18A. First a starting edge of the polygon to be filled is specified, and then two bits L and R are specified for each triangle. The L bit specifies whether there is a triangle to the left of the current triangle, and the R bit specifies whether there is a triangle to the right of the current triangle. The encoding size is of two bits per triangle. If both bits are set to a one for a triangle, the left branch is explored before the right branch.

A second suitable method for specifying a triangle tree is illustrated in FIG. 18B. First a starting edge of the polygon to be filled is specified. A succession of runs of triangles is then specified. For each run, the length is specified, as well as whether the run ends in a leaf triangle or in a branching triangle. If the run is of length greater than one, a marching pattern is also specified, such as the pattern LR for a run of length three in FIG. 18B, specifying that the second triangle is to the left of the first triangle and that the third triangle is to the right of the second triangle. If a branching node is encountered, the left branch is explored before the right branch. It is estimated that this second method requires asymptotically one bit per triangle for very large triangle trees.

Figure 19A:
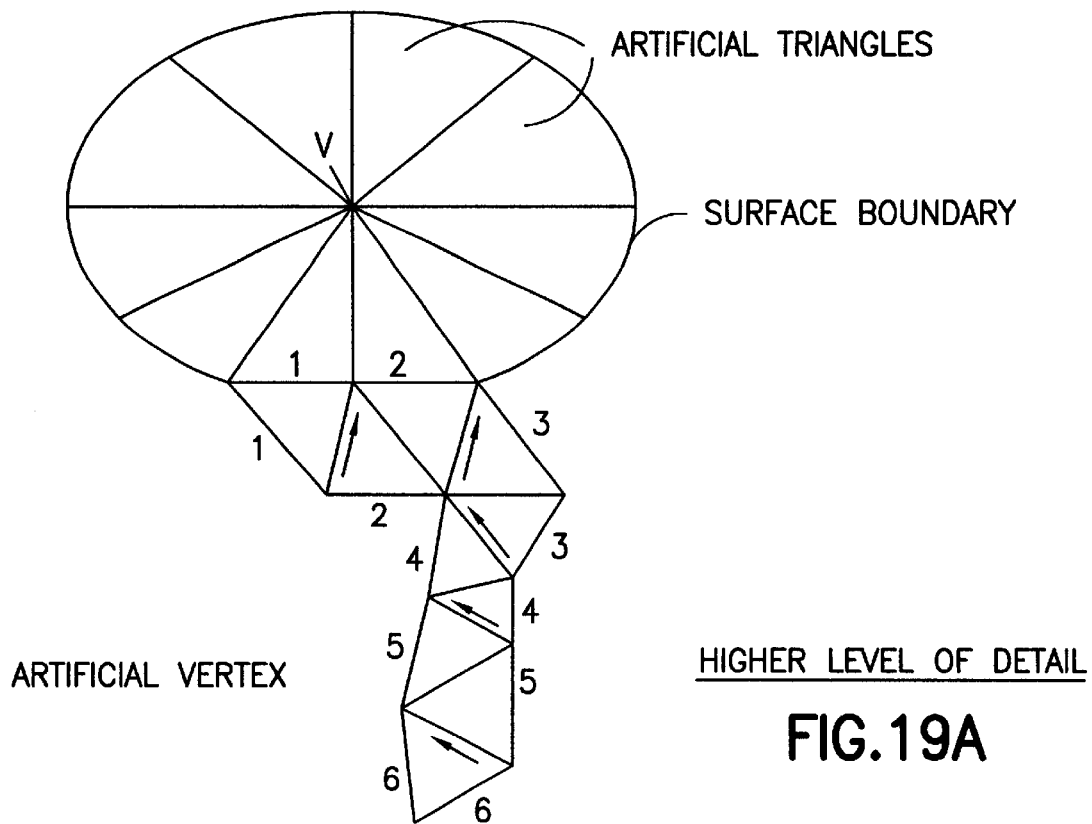
FIG. 19 illustrates how artificial vertices are introduced to triangulate boundaries of surfaces with boundaries.
Figure 19B:
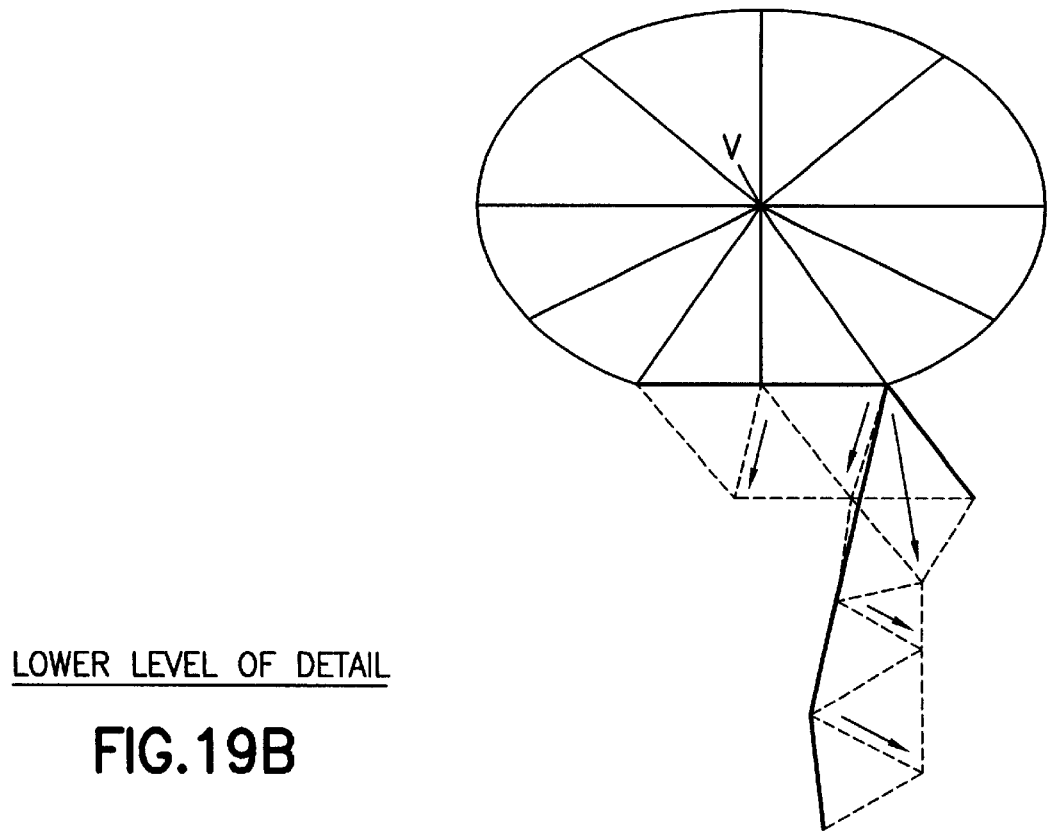

In the case of a surface with boundaries, marked edges 21 may have endpoints that are boundary vertices. New edges introduced after cutting through the marked edges would not form a loop. For each boundary, as shown in FIG. 19, an "artificial vertex" is introduced, and each boundary is triangulated with "artificial triangles" such that the link of the artificial vertex is in one to one correspondence with the boundary. A convention is used to assign an "artificial ID" to artificial vertices. The artificial triangles can be easily recognized as triangles incident to one vertex with an artificial ID, and can thus be easily removed or simply ignored when rendering the surface.

In a second stage of Step 800 of FIG. 13 the triangle trees are globally ordered according to their origin vertices.

Figure 16:
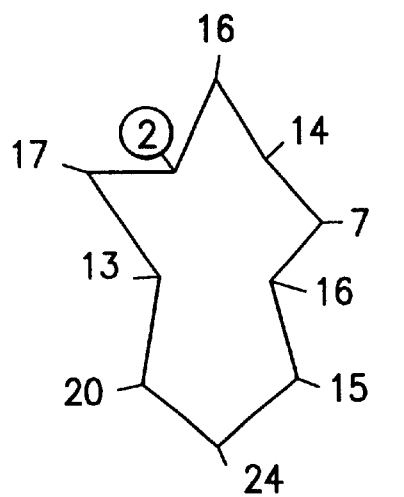
FIG. 16 illustrates a convention for choosing a vertex origin in a closed loop of edges by using the lowest vertex index in the loop.
Figure 16:
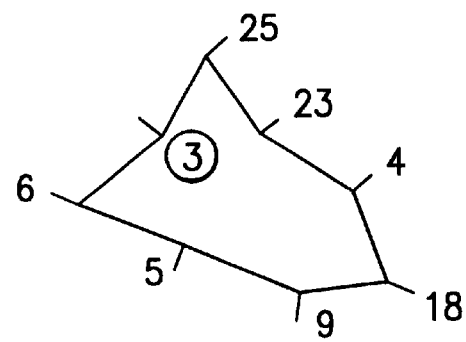

For example, and referring to FIG. 16, a triangle tree corresponding to a loop of edges with an origin of 2 is listed before a triangle tree corresponding to a loop of edges with an origin of 3 in the ordering. For increasing the surface LOD, triangle trees are provided in the same order.

Based on the foregoing description it can be appreciated that, in accordance with an aspect of this invention, several vertex splits can be represented by providing marked edges and a triangle forest. Marked edges can be efficiently encoded using a stream of bits whose length does not exceed the number of edges in the surface, and which can be assumed to be proportional to n. Each triangle tree is identified using a stream of bits whose length approaches two bits per triangle. Hence the number of bits that are used for specifying a LOD change, using the method of this invention, is proportional to n.

The teaching of this invention further provides vertex displacements for an entire loop of vertices, a closed curve, rather than for just two vertices as in the prior art method discussed previously, and efficient techniques can be used to compress the vertex displacements. Such compression methods, such as methods that are known in the art for compressing closed curves, include, but are not limited to, Fourier methods.

Furthermore, using the teaching of this invention it is possible to specify surface updates as individual vertex splits, or as batches of vertex splits, thus overcoming a perceived drawback in the prior art approach where each individual vertex split must be specified.

In addition, using the teaching of this invention one is enabled to transmit the original polygonal surface as the highest level of detail, thus avoiding the loss of detail inherent in prior art techniques, such as the one provided by Eck et al. Also, the technique of this invention is largely insensitive to such factors as the Euler characteristic of the surface.

As but one suitable use for the teachings of this invention, a radiotherapy planning system can include a computer visualization subsystem, such as one similar to the computer system 50 shown in FIG. 9. The computer visualization subsystem uses polygonal surface representations of one or more anatomical structures based on radiographic, MRI, ultrasound, or some other tissue imaging system. The anatomical structures can be represented at a plurality of levels of detail (LOD). The changes of level of detail are operated on as described above to enable, for example, the polygonal surface representations to be transferred through a computer network from one site to another, and/or to be displayed to a user of the computer visualization system with various levels of detail.

Although the invention has been shown and described with respect to the particular embodiments thereof, it should be understood by those skilled in the art that the foregoing and various other changes, omissions, and additions in the form and detail thereof may be made without departing from the spirit and scope of the invention.

What is claimed is:

1. A computer implemented method for increasing the level of detail of a polygonal surface, comprising steps of:
    providing data in a memory of a computer for representing a polygonal surface defined at least by a plurality of vertices, triangles and edges;
    providing a list of marked edges;
    cutting through the marked edges thereby creating new boundary vertices;
    applying displacements to the new boundary vertices thereby generating at least one hole in the surface, the hole being bounded by the displaced new boundary vertices; and
    filling the at least one hole with a forest of triangles,
        wherein each vertex is specified by a tuple of vertex coordinates, each triangle is specified by a triple of vertex indices, each edge is specified as a pair of vertex indices of a triangle, where a corner is a pair formed with a triangle and a vertex index of that triangle, where each vertex has a vertex ID, each triangle has a triangle ID, and each corner has a corner ID, and
        wherein the step of cutting through marked edges comprises:
            determining a set of vertices to be processed;
            forming corner groups from the corners associated with each vertex of the set of vertices;
            choosing a representative of a corner group as a corner of lowest ID;
            for each vertex of the set for which the associated number of corner groups is larger than one, replacing the corner group of lowest ID with the vertex; and
            for each said vertex, and for each additional corner group, replacing the corner group with a new vertex, such that new vertex IDs are attributed consecutively to corner groups in order of increasing corner group representative ID.

2. A method as in claim 1, wherein the step of cutting uses a Local Cutting Method.

3. A method as in claim 1, wherein the step of cutting uses a Global Cutting Method.

4. A method as in claim 1, wherein the step of providing data includes a step of appending artificial vertices and artificial triangles to the polygonal surface to fill potential boundary holes; and further comprising an additional step of removing or ignoring the artificial vertices and artificial triangles when rendering the surface for display.

5. A computer implemented method for automatically generating a computer representation of an increase in a level of detail of a polygonal surface, comprising the steps of:
    simplifying the polygonal surface;
    computing a low level of detail (LOD) polygonal surface;
    computing edge marks and vertex displacements relative to the low LOD polygonal surface; and
    determining a triangle forest to be added and stitched to the low LOD polygonal surface to form a higher LOD polygonal surface,
        wherein the step of simplifying said polygonal surface comprises steps of:
            creating a priority queue of surface edges, and
            for each edge in the priority queue, extracting an edge from the queue, testing the collapsibility of the extracted edge, and collapsing the extracted edge if the edge is determined to be collapsible, wherein the step of testing the collapsibility of the extracted edge is comprised of the steps of:

applying at least one primary collapsibility test to an edge extracted from the queue;

if the edge passes the at least one primary collapsibility test, applying further tests for determining whether an incremental surface comprised of a set of collapsed triangles is a triangle forest, and for determining whether the set of collapsed triangles and a set of remaining triangles are manifolds; and applying at least one secondary collapsibility test to the edge extracted from the queue.

6. A method as in claim 5, wherein the step of applying further tests is comprised of steps of:

performing a test to determine that the incremental surface has no interior vertices;

performing a test to determine that a split surface and the incremental surface are manifolds; and performing a test to determine if a loop exists in the incremental surface.

7. A method as in claim 5, wherein the step of applying further tests is comprised of steps of:

performing a comprehensive test on an incremental surface based on triangle adjacency tests, triangle/vertex adjacency tests, and vertex and triangle boundary tests.

8. A method as in claim 5, wherein the polygonal data is representative of at least one anatomical structure.

9. A computer implemented method for cutting through a representation of a polygonal surface, the polygonal surface being representative of an actual structure, comprising steps of:

providing data in a memory of a computer for representing the polygonal surface defined by triangles comprises edges, wherein each edge is defined by two vertices, wherein each vertex is specified by a tuple of vertex coordinates, each triangle is specified by a triple of vertex indices, each edge is specified as a pair of vertex indices of a triangle, each corner is a pair formed with a triangle and a vertex index of that triangle, each vertex having a vertex ID, each triangle having a triangle ID, and each corner having a corner ID;

determining a set of vertices to be processed;

forming corner groups from the corners associated with each vertex of the set of vertices;

choosing a representative of a corner group as the corner of lowest ID;

for each vertex of the set for which the associated number of corner groups is larger than one, replacing the corner group of lowest ID with the vertex; and for each vertex, and for each additional corner group, replacing the corner group with a new vertex, such that new vertex IDs are attributed consecutively to corner groups in order of increasing corner group representative ID.

* * * * *